United States Patent
Wakabayashi et al.

(10) Patent No.: US 12,010,434 B2
(45) Date of Patent: Jun. 11, 2024

(54) SOLID-STATE IMAGING APPARATUS AND ELECTRONIC DEVICE TO PERFORM ARITHMETIC OPERATION OF NEURAL NETWORK

(71) Applicant: SONY SEMICONDUCTOR SOLUTIONS CORPORATION, Kanagawa (JP)

(72) Inventors: Hayato Wakabayashi, Kanagawa (JP); Ryoji Ikegaya, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 224 days.

(21) Appl. No.: 17/608,764

(22) PCT Filed: May 14, 2020

(86) PCT No.: PCT/JP2020/019272
§ 371 (c)(1),
(2) Date: Nov. 4, 2021

(87) PCT Pub. No.: WO2020/230850
PCT Pub. Date: Nov. 19, 2020

(65) Prior Publication Data
US 2022/0264003 A1 Aug. 18, 2022

(30) Foreign Application Priority Data
May 15, 2019 (JP) ................. 2019-092323

(51) Int. Cl.
*H04N 23/80* (2023.01)
*G06V 10/82* (2022.01)

(52) U.S. Cl.
CPC ............. *H04N 23/80* (2023.01); *G06V 10/82* (2022.01)

(58) Field of Classification Search
CPC ...... H04N 23/80; H04N 23/60; H04N 25/571; G06V 10/82; G06V 10/10; G06V 10/12;
(Continued)

(56) References Cited

U.S. PATENT DOCUMENTS

| 5,778,153 A | 7/1998 | Wang |
| 6,683,645 B1 | 1/2004 | Collins et al. |

(Continued)

FOREIGN PATENT DOCUMENTS

| JP | 07-210534 A | 8/1995 |
| JP | 10-293851 A | 11/1998 |

(Continued)

OTHER PUBLICATIONS

Miyashita, et al., "Convolutional Neural Networks using Logarithmic Data Representation", Neural and Evolutionary Computing, Mar. 17, 2016, 10 pages.

(Continued)

*Primary Examiner* — Padma Haliyur
(74) *Attorney, Agent, or Firm* — CHIP LAW GROUP

(57) ABSTRACT

Provided is a solid-state imaging apparatus and an electronic device, in which a scale of circuits, to perform arithmetic operation of the neural network, is suppressed. A solid-state imaging apparatus according to an aspect of the present disclosure includes a pixel array unit and a processing unit. The pixel array unit has a plurality of first pixels that generate electric signals, which have a logarithmic characteristic with respect to light quantity, as first pixel signals. The processing unit performs arithmetic processing of the first neural network based on a plurality of first input data, which are based on the plurality of first pixel signals read from the pixel array unit, and a plurality of logarithmic weighting factors which express strength of the connection between the plurality of first nodes by a logarithm.

11 Claims, 22 Drawing Sheets

(58) Field of Classification Search
CPC .. G06V 10/255; G06V 10/955; G06V 40/166; G06N 3/063
See application file for complete search history.

(56) References Cited

U.S. PATENT DOCUMENTS

| | | | |
|---|---|---|---|
| 2013/0039575 A1* | 2/2013 | Livingston | H04N 9/646 |
| | | | 382/167 |
| 2015/0228061 A1* | 8/2015 | Shin | G06T 5/50 |
| | | | 382/167 |
| 2017/0359537 A1 | 12/2017 | Sakano et al. | |
| 2020/0273180 A1* | 8/2020 | Kaufmann | G06T 7/246 |
| 2021/0232899 A1* | 7/2021 | Takamaeda | G06N 3/045 |

FOREIGN PATENT DOCUMENTS

| | | | |
|---|---|---|---|
| JP | 2000-502224 A | 2/2000 | |
| JP | 2015-035172 A | 2/2015 | |
| JP | 2017-107132 A | 6/2017 | |
| JP | 2017-108457 A | 6/2017 | |
| JP | 2018-501708 A | 1/2018 | |
| WO | WO-2019155910 A1 * | 8/2019 | .......... G06F 7/4833 |

OTHER PUBLICATIONS

Daeyun Kim, "An Enhanced Dynamic-Range CMOS Image Sensor Using a Digital Logarithmic Single-Slope ADC", IEEE, Transactions on Circuits and Systems II: Express Briefs, vol. 59, No. 10, Oct. 2012, pp. 653-657.

Zohoor, et al., "Toward Always-On Mobile Object Detection: Energy Versus Performance Tradeoffs for Embedded HOG Feature Extraction", IEEE, Transactions on Circuits and Systems for Video Technology, vol. 28, No. 5, Jan. 16, 2017, pp. 1102-1115.

International Search Report and Written Opinion of PCT Application No. PCT/JP2020/019272, dated Jun. 16, 2020, 11 pages of ISRWO.

* cited by examiner

SOLID-STATE IMAGING APPARATUS AND ELECTRONIC DEVICE TO PERFORM ARITHMETIC OPERATION OF NEURAL NETWORK

CROSS REFERENCE TO RELATED APPLICATIONS

This application is a U.S. National Phase of International Patent Application No. PCT/JP2020/019272 filed on May 14, 2020, which claims priority benefit of Japanese Patent Application No. JP 2019-092323 filed in the Japan Patent Office on May 15, 2019. Each of the above-referenced applications is hereby incorporated herein by reference in its entirety.

TECHNICAL FIELD

The present disclosure relates to a solid-state imaging apparatus and an electronic device.

BACKGROUND ART

Recently data learning methods using a neural network is widely used as a type of machine learning. Neural networks are used in various fields, including as an application for image recognition of image data captured by such an imaging apparatus as a camera.

In the case of using a neural network for image recognition, data to be a target of image recognition is provided to nodes (input nodes) in an input layer. In nodes (intermediate nodes) in an intermediate layer, which is a subsequent stage of the input layer, an arithmetic operation is performed based on: data inputted from each input node; and a weighting factor which indicates strength of the connection with each input node. In other words, a weighted sum of the input data and the weighting factor is calculated. In this calculation, a product-sum operation is performed, which means that the operation amount is large. Further, if a multiplication circuit is used for the product-sum operation, the circuit scale becomes large, which is another problem. This is the same for the nodes of each layer in the subsequent stages of the intermediate layer.

CITATION LIST

Non Patent Literature

[NPL 1]
Daisuke Miyashita, Edward H. Lee, and Boris Murmann, "Convolutional neural networks using logarithmic data representation", CoRR, vol. abs/1603. 01025, 2016.
[NPL 2]
D. Kim, "An Enhanced Dynamic-Range CMOS Image Sensor Using a Digital Logarithmic Single-Slope ADC", IEEE Transactions on circuit and systems 2012.
[NPL 3]
Alex Omid-Zohoor, "Toward Always-On Mobile Object Detection: Energy Versus Performance Tradeoffs for Embedded HOG Feature Extraction", IEEE Transactions on circuit and systems for video technology 2018.

SUMMARY

Technical Problem

A method to solve the above problem is to convert the data provided to the input nodes and the weighting face between each node into a base 2 logarithm ($\log_2$ conversion) (see NPL 1). According to this method, the operation at each node can be performed by addition in the logarithmic space, hence the multiplication operation at each node is not required. In other words, the multiplication circuit is unnecessary. However a circuit to perform $\log_2$ conversion on the data provided to the input nodes is additionally required. This leads to an increase in the circuit scale, and an increase in the power consumption.

The present disclosure provides a solid-state imaging apparatus and an electronic device, in which a scale of circuits to perform arithmetic operation of the neural network is suppressed.

Solution to Problem

A solid-state imaging apparatus according to an aspect of the present disclosure includes a pixel array unit and a processing unit. The pixel array unit has a plurality of first pixels that generate electric signals, which have a logarithmic characteristic with respect to light quantity, as first pixel signals. The processing unit performs arithmetic processing for a first neural network based on a plurality of first input data, which are based on the plurality of first pixel signals read from the pixel array unit, and a plurality of logarithmic weighting factors which express strength of the connection between the plurality of first nodes by a logarithm.

The first pixel signal indicates a voltage value, and the voltage value is in proportion to a logarithm of an electric current value to the base of a predetermined value, and the processing unit may generate the first input data by multiplying the value of the first pixel signal by a logarithm of which an anti-logarithm is the predetermined value.

The predetermined value may be a Napier's constant.

The base of the logarithm, of which anti-logarithm is the predetermined value, may be 2.

The solid-state imaging apparatus includes a control unit. The pixel array unit includes a plurality of second pixels of which type is different from the plurality of first pixels. The control unit selectively executes a first read processing to read the first pixel signals from the plurality of first pixels, or a second read processing to read the plurality of second pixel signals from the plurality of second pixels. In a case where the first read processing is executed, the processing unit performs the arithmetic processing of the first neural network. In a case where the second read processing is executed, the processing unit performs the arithmetic processing of a second neural network based on a plurality of second input data, which are based on the plurality of second pixel signals, and a weighting factor that indicates the strength of the connection between the plurality of second nodes.

The control unit may select one of the first read processing and the second read processing in accordance with indication data that indicates one of the first read processing and the second read processing.

The second pixel may be a pixel that generates an electric signal having a linear characteristic with respect to the light quantity, as the second pixel signal.

The second pixel may be a pixel that generates a count value of the number of entered photons, as the second pixel signal.

The second pixel may be a pixel that generates a charge amount, which indicates a phase difference of a reflected light of an emitted light from the emitted light, as the second pixel signal.

The solid-state imaging apparatus may include a control unit. The first pixel may include: a photoelectric conversion unit; a first read unit that reads an electric signal having a logarithmic characteristic from the photoelectric conversion unit, as the first pixel signal; and a second read unit that reads an electric signal having a linear characteristic from the photoelectric conversion unit, as the second pixel signal. The control unit may selectively execute a first read processing to read the first pixel signals using the first read unit, or a second read processing to read the second pixel signals using the second read unit. In a case where the first read processing is executed, the processing unit may perform the arithmetic processing of the first neural network, and in a case where the second read processing is executed, the processing unit may perform the arithmetic processing of a second neural network based on a plurality of second input data, which are based on the plurality of second pixel signals, and a weighting factor which expresses strength of the connection between the plurality of second nodes.

The processing unit may perform image recognition for the images indicated by the plurality of first pixel signals using the arithmetic processing of the first neural network.

An electronic device according to an aspect of the present disclosure includes: an image pickup element that includes a pixel array unit having a plurality of first pixels that generate electric signals, which have a logarithmic characteristic with respect to light quantity, as first pixel signals; and a processing circuit configured to perform arithmetic processing of a first neural network based on a plurality of first input data, which are based on the plurality of first pixel signals read from the pixel array unit, and a plurality of logarithmic weighting factors which express strength of the connection between the plurality of first nodes by a logarithm.

DESCRIPTION OF EMBODIMENTS

Embodiments of the present disclosure will be described with reference to the drawings. In at least one embodiment described in the present disclosure, composing elements included in each embodiment may be combined, and such combinations are within the scope of the embodiments according to the present disclosure.

Figure 1:
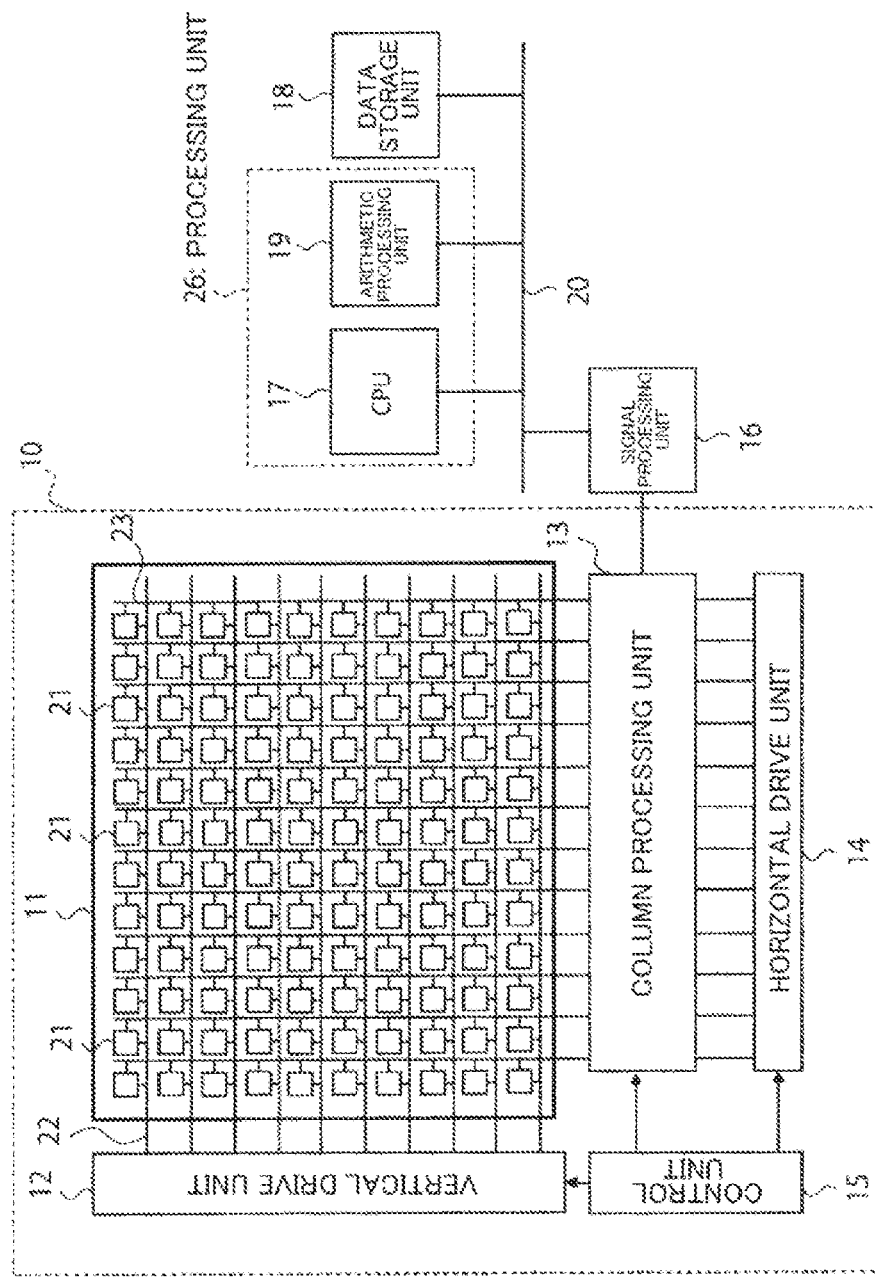
FIG. 1 is a block diagram depicting a configuration example of a solid-state imaging apparatus according to Embodiment 1 of the present disclosure.

FIG. 1 is a block diagram depicting a configuration example of a solid-state imaging apparatus according to Embodiment 1 of the present disclosure. The solid-state imaging apparatus in FIG. 1 includes an image pickup element 10, a signal processing unit 16, a central processing unit (CPU) 17, a data storage unit 18, an arithmetic processing unit 19, and a bus 20. The image pickup element 10 includes a pixel array unit 11 which has a plurality of pixels 21, a vertical drive unit 12, a column processing unit 13, a horizontal drive unit 14, and a control unit 15. The CPU 17 and the arithmetic processing unit 19 constitute a processing unit 26.

The solid-state imaging apparatus in FIG. 1 is a complementary metal oxide semiconductor (CMOS) type solid-state imaging apparatus, for example, and can be used for various electronic devices. Examples of the electronic devices include a mobile device having an imaging function (e.g. smartphone, tablet, portable telephone), an imaging device (e.g. digital still camera, video camera), a surveillance camera and an on-board camera.

The structure of the image pickup element 10 may be a back-illuminated type where the pixel array unit 11 and logic circuits (vertical drive unit 12, column processing unit 13, horizontal drive unit 14 and control unit 15) are disposed on the same support substrate and are illuminated from the back surface of the substrate. Further, the structure of the image pickup element 10 may be a stacked type, where the pixel array unit 11 and the logic circuits are separately fabricated and stacked. In this case, each stacked layer is electrically connected using a connecting portion (e.g. via hole). Beside a via hole, this connection may be performed by Cu—Cu bonding or by bumps. The structure of the image pickup element may be a stacked type, which includes the pixel array unit 11, the vertical drive unit 12, the column processing unit 13, the horizontal drive unit 14, the control unit 15, the signal processing unit 16, the CPU 17, the data storage unit 18, the arithmetic processing unit 19, and the bus 20.

The pixel array unit 11 includes a plurality of pixels 21 which are disposed two-dimensionally (in a matrix). The region where the plurality of pixels 21 are disposed corresponds to a pixel region. The pixel 21 includes a photoelectric conversion unit which includes a photodiode (PD) and a plurality of pixel transistors. A photodiode is an element that converts incident light into electric signals (signal charges) by photoelectric conversion. The plurality of pixel transistors are metal oxide semiconductor (MOS) transistors, for example.

The photoelectric conversion unit of the pixel 21 receives light via an optical lens (not illustrated), and generates an electric signal, which changes logarithmically with respect to the light quantity of the incident light, as a pixel signal. The generated electric signal (pixel signal) is a voltage signal that indicates output voltage of the pixel 21. In the pixel 21, electric current flows exponentially with respect to the voltage generated in the photodiode, hence the voltage and the electric current are in a logarithmic relationship, and a logarithmic voltage signal is outputted. The pixel 21, which generates a voltage signal, having a logarithmic characteristic with respect to the light quantity of the incident light, as the pixel signal, is referred to as a "logarithmic pixel". In the following description, the pixel 21 may be referred to as a "logarithmic pixel 21". The logarithmic pixel 21 corresponds to an example of a first pixel, and the pixel signal that is read from the logarithmic pixel 21 corresponds to a first pixel signal that is read from the first pixel. The logarithmic pixel has more noise than a pixel having a linear characteristic (called a "linear signa", of which output signal increases linearly with respect to the light quantity, but has a wider dynamic range characteristic.

Figure 2:
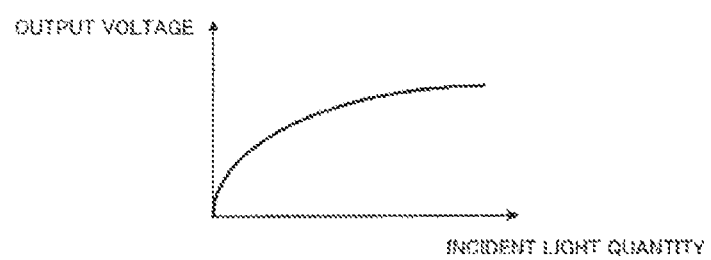
FIG. 2 is a graph schematically expressing the characteristic of a logarithmic pixel.

FIG. 2 is a graph schematically expressing the relationship between the light quantity of the incident light to a logarithmic pixel and the output voltage. As the light quantity of the incident light increases, the output voltage increases logarithmically.

When the electric current of the logarithmic pixel is i and the voltage thereof is v, the relationship of i and v can be approximated by the following expression of a natural logarithm, for example. A is a predetermined coefficient. When a logarithm is expressed as $\log_a b$, a is referred to as a "base", and b is referred to as an "anti-logarithm". A constant term may be included on the right side of Expression (1). Here the relationship of i and v is approximated with the natural logarithm, but may be approximated with a logarithm of which base is a predetermined value other than a Napier's constant (e).

[Math. 1]
$$v = A * \log_e i \quad (1)$$

Figure 3:
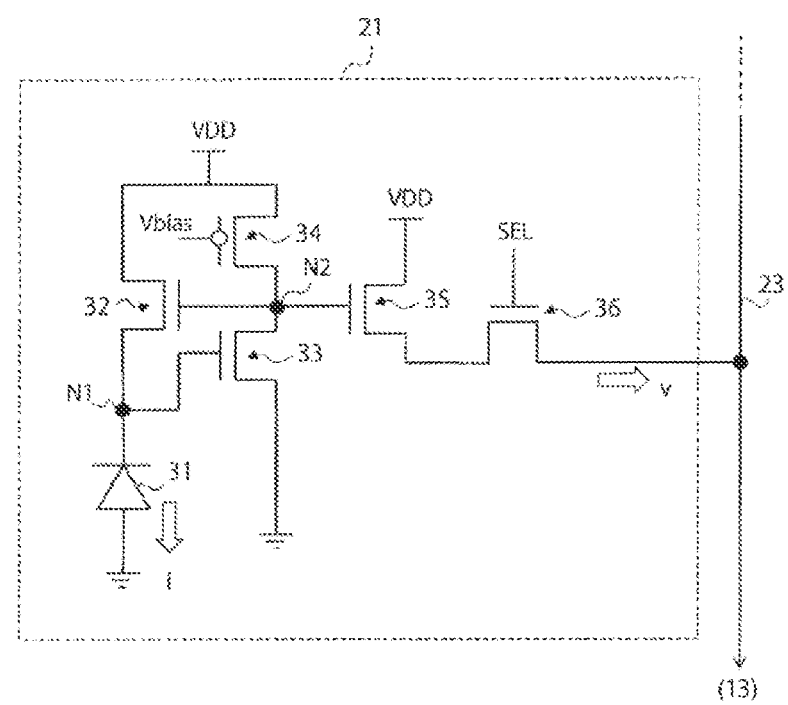
FIG. 3 is a diagram depicting an example of a circuit configuration of the logarithmic pixel.

FIG. 3 indicates an example of a circuit configuration of the logarithmic pixel 21. Here configuration of one logarithmic pixel 21 is indicated as an example, but each of the other logarithmic pixels 21 has the same configuration.

The logarithmic pixel 21 includes a photodiode 31, which corresponds to the photoelectric conversion unit, and a plurality of pixel transistors. The plurality of transistors include an output transistor 32, an amplification transistor 33, a bias transistor 34, an amplification transistor 35 and a selection transistor 36. The output transistor 32, the amplification transistor 33, the amplification transistor 35 and the selection transistor 36 are N-type transistors, for example. The bias transistor 34 is a P-type transistor, for example. However the conduction types of these pixel transistors may be the opposite of these examples. In this case, it is necessary to change the logic of the control signal and the voltage of the power supply line of these pixel transistors.

A drain terminal of the output transistor 32 is connected to a power supply voltage, and a source terminal thereof is connected to a cathode terminal of the photodiode 31. An anode terminal of the photodiode 31 is connected to a reference voltage. The reference voltage is a ground voltage, for example. The cathode terminal of the photodiode 31 is also connected to a gate terminal of the amplification transistor 33. A connection node N1 of the photodiode 31 and the amplification transistor 33 is connected to the source terminal of the output transistor 32.

The bias transistor 34 and the amplification transistor 33 are connected in series between the power supply voltage and the reference voltage. A connection node N2 of the bias transistor 34 and the amplification transistor 33 is connected to a gate terminal of the output transistor 32 and a gate terminal of the amplification transistor 35. The output transistor 32 and the amplification transistor 33 are connected in a loop via the connection node N2 and the connection node N1.

Bias voltage Vbias1 is applied to a gate terminal of the bias transistor 34.

A drain terminal of the amplification transistor 35 is connected to the power supply voltage, and a source terminal thereof is connected to a drain terminal of the selection transistor 36. A source terminal of the selection transistor 36 is connected to a vertical signal line 23. A gate terminal of the selection transistor 36 is connected to a pixel drive line 22, and the selection transistor 36 is controlled by a selection signal SEL which the vertical drive unit 12 supplies.

The photodiode 31 outputs electric current i that changes linearly with respect to the light quantity of the incident light. Voltage, in accordance with this electric current i, is applied to the gate terminal of the amplification transistor 33. The output transistor 32 and the amplification transistor 33 operate in a sub-threshold region respectively as source followers. By the output transistor 32 and the amplification transistor 33 which are connected in a loop, the voltage in the connection node N1 is fed back to the gate terminal of the output transistor 32 via the amplification transistor 33. Thereby a voltage signal of the logarithm of the electric current i is generated in the connection node N2, and the generated voltage signal is provided to the amplification transistor 35 via a buffer circuit 40. This voltage signal is amplified by the amplification transistor 35. The amplified voltage signal is outputted to the vertical signal line 23 via the selection transistor 36. In this way, the voltage signal, which changes logarithmically with respect to the light quantity of the incident light, is outputted as a pixel signal.

The configuration of the logarithmic pixel indicated in FIG. 3 is an example, and the configuration of the logarithmic pixel is not limited to the configuration in FIG. 3. Any configuration may be used for the logarithmic pixel, as long as the voltage signal, which changes in accordance with the logarithm of a photoelectric current, can be detected. Further, a circuit having a specified function may be added to the configuration in FIG. 3. For example, a sensor circuit that detects the change in brightness may be connected to the connection node N2, so as to be parallel with the amplification transistor 35.

The vertical drive unit 12 in FIG. 1 sequentially selects a pixel drive line 22 in the pixel array unit 11 in the vertical direction, and supplies a pulse (drive signal) to drive a plurality of pixels 21 which are commonly connected to the selected pixel drive line 22. For example, the vertical drive unit 12 sequentially selects the pixels 21 of the pixel array unit 11 for each row in the vertical direction, and supplies a drive signal, such as a selection signal SEL and a later mentioned reset signal RST, to the pixel drive line 22 of the selected row. Thereby the pixel signal generated in each pixel 21 is supplied to the column processing unit 13 via the vertical signal line 23. The vertical drive unit 12 is constituted of such a circuit as a shift register, for example.

The column processing unit 13 processes signals, which are outputted from one row of pixels 21, for each pixel column. The column processing unit 13 includes a unit circuit corresponding to each pixel column. The unit circuit corresponding to each pixel column receives signals outputted from corresponding pixels out of one row of pixels 21, and processes the signals. For example, the signal processing may include analog to digital (A/D) conversion, and may further include noise removal and signal amplification performed before the A/D conversion.

The horizontal drive unit 14 sequentially selects a unit circuit in the column processing unit 13 by sequentially outputting a horizontal scanning pulse. Thereby pixel signals are sequentially outputted to the signal processing unit 16 from each unit circuit in the column processing unit 13. The horizontal drive unit 14 is constituted of such a circuit as a shift register, for example.

The control unit 15 is a circuit that controls operation of each unit of the solid-state imaging apparatus. For example, based on a vertical synchronizing signal, a horizontal synchronizing signal and a master clock, the control unit 15 generates various signals, such as a clock signal and a control signal, which become references for operations of the vertical drive unit 12, the column processing unit 13, the horizontal drive unit 14, and the like. The control unit 15 outputs the generated signals to the vertical drive unit 12, the column processing unit 13, the horizontal drive unit 14, and the like.

The signal processing unit 16 performs various signal processing operations on pixel signals supplied from the column processing unit 13. In some cases, the signal processing may only buffer a pixel signal. Other examples of the signal processing include black level adjustment, column variation correction and various kinds of digital signal processing. The signal processing unit 16 is constituted of a digital signal processor (DSP), an application specific integrated circuit (ASIC), a field programmable gate array (FPGA) or circuits of a CPU, for example. The signal processing unit 16 is connected to the bus 20.

The CPU 17 is connected to the bus 20, and controls the signal processing unit 16, the data storage unit 18 and the arithmetic processing unit 19. The CPU 17 performs control to write the data of the pixel signals processed by the signal processing unit 16 into the data storage unit 18, as pixel data.

The data storage unit 18 internally stores the pixel data processed by the signal processing unit 16. By storing pixel data corresponding to each pixel 21 in the data storage unit 18, one frame of image data is stored in the data storage unit 18. The pixel data is a digital value having a predetermined bit length, and the bit length is determined by a resolution setting of the A/D conversion. In a case where the solid-state imaging apparatus performs imaging at a predetermined cycle, the image data is acquired at a predetermined cycle, and is stored in the data storage unit 18.

The data storage unit 18 is constituted of a volatile or non-volatile memory device, such as a static random access memory (SRAM), a dynamic random access memory (DRAM), a NAND type flash memory, and a magnetic resistance memory, for example. The data storage unit 18 may also be constituted of a storage medium other than a memory device, such as a register and a digital circuit. The data storage unit 18 is connected to the bus 20.

Under the control of the CPU 17, the arithmetic processing unit 19 recognizes an image of image data by performing arithmetic processing of the neural network by inputting one frame of data stored in the data storage unit 18. In other words, the arithmetic processing unit 19 performs image recognition of an image based on an image signal read from each pixel 21. An example of the image recognition is recognizing whether a predetermined object is captured in the image data. For example, it is recognized whether a face of a person is captured or not. In some cases, a type of an object captured in the image is predicted from a plurality of candidates. For example, it is predicted whether the object is a human, an animal or an object. The number of candidates in this example is 3, but may be 2 or 4 or more. The image recognition may be different from these examples, as long as the image recognition is performed based on the image data. The arithmetic processing unit 19 stores the data, which indicates the result of the image recognition, in the data storage unit 18. The data storage unit 18 stores the data calculated by the arithmetic processing unit 19, which indicates the result of the image recognition.

The arithmetic processing unit 19 is constituted of a digital signal processor (DSP), an application specific integrated circuit (ASIC), a field programmable gate array (FPGA), or circuits of a CPU, for example. The arithmetic processing unit 19 may include an internal buffer to store data. The internal buffer is constituted of arbitrary circuits, such as a register, a memory and a digital circuit. The memory may be either a volatile memory or a non-volatile memory.

A part of the processing performed by the arithmetic processing unit 19 may be executed by the CPU 17.

The data storage unit 18 stores parameters of the neural network that the arithmetic processing unit 19 uses for the arithmetic processing of the neural network. A parameter is a value generated by converting a weighting factor, which indicates a strength of the connection (link) between each node of the neural network after the learning, into a base 2 logarithm. Hereafter the converted weighting factor may be referred to as a "logarithmic weighting factor", or a "$\log_2$ weighting factor". The logarithmic weighting factor is the strength of the connection between a plurality of nodes expressed by a logarithm. In Embodiment 1, in the arithmetic processing of the neural network, the logarithmic weighting factor is used instead of the learned weighting factor. To store the logarithmic weighting factor, the data storage unit 18 stores information associating an identifier, which expresses a connection between each node of the neural network, with the logarithmic weighting factor. This information may be expressed as a table or a function to return the logarithmic weighting factor in accordance with the given identifier, for example.

All or a part of the data stored in the data storage unit 18 in the above description may be stored in an internal buffer of the arithmetic processing unit 19. For example, the above mentioned parameters may be stored in the internal buffer of the arithmetic processing unit 19. The data storage unit 18 may store a learned weighting factor.

Figure 4:
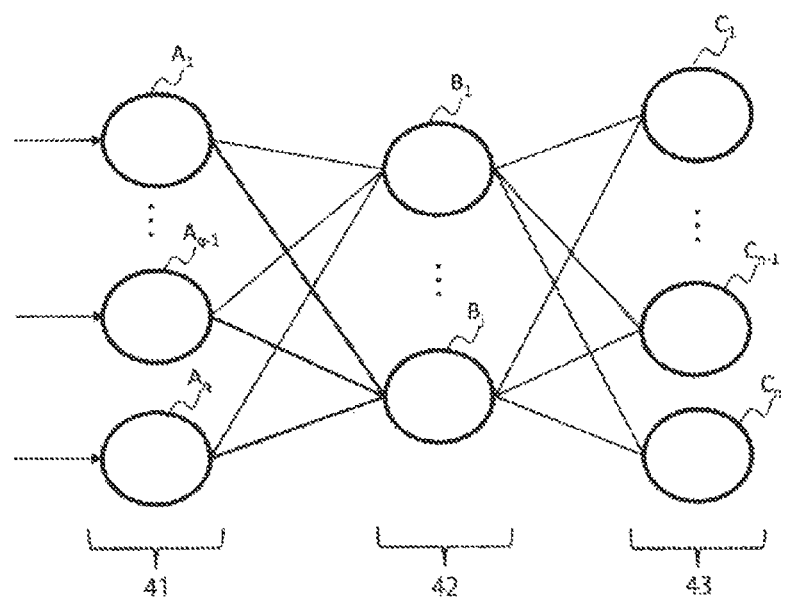
FIG. 4 is a diagram schematically indicating an example of a typical structure of a neural network.

FIG. 4 is a diagram schematically indicating an example of a typical structure of a neural network. In Embodiment 1, an example of a fully connected hierarchical neural network, in which all the nodes are interconnected between each layer, is indicated as the neural network, but other types of neural networks, such as a convolutional neural network and an interconnected neural network, may be used.

A conventional neural network will be described first with reference to FIG. 4. This neural network includes an input layer 41, an intermediate layer (hidden layer) 42 and an output layer 43. In this example, there is one intermediate layer 42, but a plurality of intermediate layers may exist. In the case where a plurality of intermediate layers exist, the intermediate layers are referred to as "a first intermediate layer, a second intermediate layer, . . . the last intermediate layer" in sequence from the side closer to the input layer 41. As the number of intermediate layer increases, the accuracy of identification improves in general.

The input layer 41 includes a plurality of (q number of) input units $A_1$ to $A_q$. The intermediate layer 42 includes a plurality of (j number of) arithmetic units $B_1$ to $B_j$. The output layer 43 includes a plurality of (n number of) arithmetic units $C_1$ to $C_n$. Hereafter the input units $A_1$ to $A_q$ are referred to as "input nodes $A_1$ to $A_q$", the arithmetic units $B_1$ to $B_j$ of the intermediate layer are referred to as "intermediate nodes $B_1$ to $B_j$", and the arithmetic units $C_1$ to $C_n$ of the output layer are referred to as "output nodes $C_1$ to $C_n$".

Each intermediate node of the intermediate layer 42 is linked with all the input nodes $A_1$ to $A_q$ of the input layer 41. In a conventional neural network, a learned weighting factor is set to each link. Each output node of the output layer 43 is linked with all the intermediate nodes $B_1$ to $B_j$ of the intermediate layer 42. A learned weighting factor is set to each link.

An arithmetic processing of a conventional neural network will be described. Input data is provided to the input nodes $A_1$ to $A_q$. Here the input data is assumed to be each pixel data of image data. For example, the number of input nodes is the same as the number of pixels to which the image data is inputted, and the pixel data of each pixel is provided to the input node. Each input node outputs the provided input data to the intermediate nodes $B_1$ to $B_j$.

Each input node multiplies the data inputted from the input nodes $A_1$ to $A_q$ by a weighting factor corresponding to the input nodes $A_1$ to $A_q$ respectively, and determines the sum of the multiplication results. In other words, a product-sum of the inputted data and weighting factor (weighted sum) is determined. Then, using the result of the product-sum operation as an input variable of the activation function, the activation function is calculated. Each intermediate node outputs the output value of the activation function to the output nodes $C_1$ to $C_n$ respectively.

For example, it is assumed that the weighting factors between the intermediate node $B_1$ and the input nodes $A_1$ to $A_q$ are $w_1$ to $w_q$, and the data inputted from the input nodes $A_1$ to $A_q$ to the intermediate node $B_1$ are $d_1$ to $d_q$. In this case, the product-sum operation value ($X_{B1}$) at the intermediate node $B_1$ and the output value ($Y_{B1}$) of the activation function are given by the following expression.

[Math. 2]

$$X_{B1} = \sum_{k=1}^{q} w_k d_k \quad (2-1)$$

-continued $$Y_{B1} = f\left(\sum_{k=1}^{q} w_k d_k\right) \quad (2-2)$$

The function f indicates the activation function. Σ indicates the product-sum operation (weighted sum) between the weighting factors $w_1$ to $w_q$ and the input data $d_1$ to $d_q$. An arithmetic operation example in the intermediate node $B_1$ is indicated here, but the same arithmetic operation is also performed in the intermediate nodes $B_2$ to $B_j$. The output values of the intermediate nodes $B_1$ to $B_j$ become the data to be inputted to the output nodes $C_1$ to $C_m$.

For the activation function, an arbitrary nonlinear function, such as an ReLU function and a step function, is used, for example. However a linear function may be used.

The ReLU function is a function that outputs 0 if the input variable is 0 or less, and directly outputs the value of the input variable if the input variable exceeds 0. When the ReLU function is ReLu(x) and the input variable is x, ReLu(x) is defined as follows.

[Math. 3]

$$ReLu(x) = \begin{cases} x & (x > 0) \\ 0 & (x \leq 0) \end{cases} \quad (3)$$

The step function is a function that outputs 0 if the input variable is 0 or less, and outputs 1 if the input variable exceeds 0. When the step function is Step(x) and the input variable is x, Step(x) is defined as follows.

[Math. 4]

$$Step(x) = \begin{cases} 1 & (x > 0) \\ 0 & (x \leq 0) \end{cases} \quad (4)$$

The activation function of each intermediate node of the intermediate layer is the same here, but the activation function may be different depending on the intermediate node.

The arithmetic operation of each output node is the same as the arithmetic operation of the intermediate node. Specifically, each output node multiplies the data inputted from the intermediate nodes $B_1$ to $B_j$ by a weighting factor corresponding to the intermediate nodes $B_1$ to $B_j$ respectively, and determines the sum of the multiplication results. In other words, a product-sum of the inputted data and weighting factor (weighted sum) is determined. Then using the result of the product-sum operation as an input variable of the activation function, the activation function is calculated. The output value of the activation function at each output node becomes the output of each output node.

The activation function of each output node of the output layer is the same here, but the activation function may be different depending on the output node. It does not matter whether the activation function of the output layer is the same as or different from the activation function of the intermediate layer.

The arithmetic processing unit 19 performs determination processing based on the output value of each output node, and outputs the result of the determination processing as the result of the image recognition.

For example, a class is assigned to each output node and a class of an output node, which outputted the largest output value, is regarded as the identification result. It is assumed, for example, that two output nodes exist, and a first class assigned to one of the output nodes (first output node) is a class indicating that a face of a person is captured in the image. It is also assumed that a second class assigned to the other output node (second output node) is a class indicating that a face of a person is not captured in the image. In this case, a signal that indicates the first class is outputted if the output value of the first output node is larger than the output value of the second output node. In other words, it is determined that a face of a person is captured in the image data provided to the neural network as input. If the output value of the second output node is larger than the output value of the first output node, on the other hand, a signal that indicates the second class is outputted. In other words, it is determined that a face of a person is not captured in the image data provided to the neural network as input.

The above mentioned determination processing based on the output value of each output node is merely an example, and a different determination processing may be used. For example, the output value of each output node is compared with a threshold, and in the case where a ratio of the number of output nodes, of which output values are the threshold or more, is a predetermined value or more, it is determined that a first identification result is acquired (e.g. it is determined that a face of a person is captured in the image). In a case where this ratio is less than the predetermined value, it is determined that a second identification result is acquired (e.g. it is determined that a face of a person is not captured in the image). Another example is that a largest output value, out of the output values of the output nodes, is specified, and in a case where the specified output value is a predetermined value or more, it is determined that a first identification result is acquired, and in a case where the specified output value is less than the predetermined value, it is determined that a second identification result is acquired. The threshold is stored in the data storage unit 18 or in an internal buffer of the arithmetic processing unit 19 in advance. The determination method based on the output value of each output node may be arbitrarily defined in accordance with the configuration of the neural network of the learning method, or the like.

In a case where a plurality of intermediate layers exist, each intermediate node of the intermediate layer in the first stage is linked with all the input nodes $A_1$ to $A_q$, and a weighting factor is set for each link. Further, between adjacent intermediate layers, each intermediate node of an intermediate layer in a subsequent stage is linked with all the intermediate nodes of the intermediate layer in a previous stage, and a weighting factor is set for each link. Then each output node of the output layer 43 is linked with all the intermediate nodes of the intermediate layer in the final stage, and a weighting factor is set to each link. In each intermediate node of an intermediate layer in the second or later stage, output values of all the intermediate nodes of the intermediate layer in a previous stage become input data. The arithmetic operation of each intermediate node of the intermediate layer in the second or later stage is the same as the case of the intermediate layer 42 described above.

For this learning of the neural network, a plurality of image data of which identification result (correct solution) is already known is provided as learning data, and the weighting factors between the nodes are adjusted so that this identification result (correct identification result) is acquired when image data is inputted to the input layer. The identification result that is known in advance is referred to as a "teacher signal". This adjustment of the weighting factors can be performed by such a method as a back propagation method. The back propagation method is a method of adjusting the weighting factors sequentially from the output layer side, so that the shift between the output of the neural network and the teacher signal decreases.

The above was a description of a commonly used neural network, and the neural network according to Embodiment 1 will be described next with reference to FIG. 4 to FIG. 6. FIG. 4, which was used to describe the conventional neural network, indicates the general structure of a neural network, and the neural network according to Embodiment 1 will also be described with reference to FIG. 4. The neural network according to Embodiment 1 corresponds to the first neural network, for example, and each node in the first neural network corresponds to the first node, for example.

In Embodiment 1, for the data that is provided to each input node of the neural network, the arithmetic processing unit 19 converts the pixel data, and this converted data is used as the input data (first input data). Specifically, in Expression (1), electric current value i, which is in the relationship with the value (voltage value), indicated by the pixel data of each pixel 21, is converted into a base 2 logarithm, and this data ($\log_2 i$) is used. This converted data is referred to as "logarithmic pixel data". Using the change of base formula, the above mentioned Expression (1) is converted into Expression (5-1), and is further converted into Expression (5-2), whereby the logarithmic pixel data ($\log_2 i$) is derived.

[Math. 5]

$$v = A * \frac{\log_2 i}{\log_2 e} \qquad (5\text{-}1)$$

$$\log_2 i = v * \frac{\log_2 e}{A} = v * A' \qquad (5\text{-}2)$$

Since both A and $\log_2 e$ are fixed values, A' is also a fixed value. Therefore $\log_2 i$ can be calculated by multiplying the value (v) of the pixel data by A'. Since A' is a fixed value, this arithmetic operation is simple, and can be implemented with a small scale arithmetic operation amount, or by a small scale circuit. In other words, a circuit ($\log_2$ conversion circuit) for converting the pixel data into a base 2 logarithm ($\log_2$ conversion) is unnecessary. $\log_2 e$ is an example of a logarithm of which anti-logarithm is a predetermined value (a Napier's constant in this case) as the anti-logarithm.

In the arithmetic processing of the neural network according to Embodiment 1, the logarithmic weighting factor, which is generated by converting the learned weighting factor into the base 2 logarithm, is used as a weighting factor between each node. "Between each node" refers to "between an input node and an intermediate node" and "between an intermediate node and an output node". In the case where a plurality of intermediate layers exist, "between each node" also refers to "between intermediate nodes of different intermediate layers". As described above, the arithmetic processing of the neural network according to Embodiment 1 is performed based on the logarithmic pixel data which is provided to each input node and the logarithmic weighting factor which is set between each node.

The content of the arithmetic processing at the intermediate node will be described next. First the logarithmic pixel data that is inputted from each input node connected to the intermediate node and the logarithmic weighting factor with respect to each input node are added respectively. Since both targets of the addition are logarithms, the addition result is also a logarithm. Here $\log_2 i+\log_2 w=\log_2(i*w)$ is established, hence the value determined by adding the logarithmic pixel data ($\log_2 i$) and the logarithmic weighting factor ($\log_2 w$) is equal to the value generated by converting a product value ($i*w$) of the electric current data i and the weighting factor w into the base 2 logarithm. $\log_2(i*w)$ can be calculated merely by adding the inputted logarithms, without directly calculating $i*w$. Therefore the multiplication operation in the arithmetic processing in a conventional neural network can be replaced with an addition operation.

Then $\log_2$ of the sum of the anti-logarithm of the addition result (logarithmic value) for each input node is calculated. Calculating $\log_2$ of the sum of the anti-logarithms of a plurality of logarithmic values is referred to as a "$\log_2$ addition". The value calculated by the $\log_2$ addition is referred to as a "$\log_2$ addition value".

For example, when the addition result for each input node is $\log_2(i_1*w_1)$, . . . , $\log_2(i_{q-1}*w_{q-1})$, $\log_2(i_q*w_q)$, the $\log_2$ addition value thereof is $\log_2(i_1*w_1+, \ldots, +i_{q-1}*w_{q-1}i+i_q*w_q)$. The $\log_2$ addition can be implemented with a small scale arithmetic operation amount or by a small scale circuit.

The output value of the activation function is calculated using a calculated $\log_2$ addition value as an input variable of the activation function. A concrete example will be described next using an intermediate node $B_1$ in FIG. 4 as an example.

Figure 5:
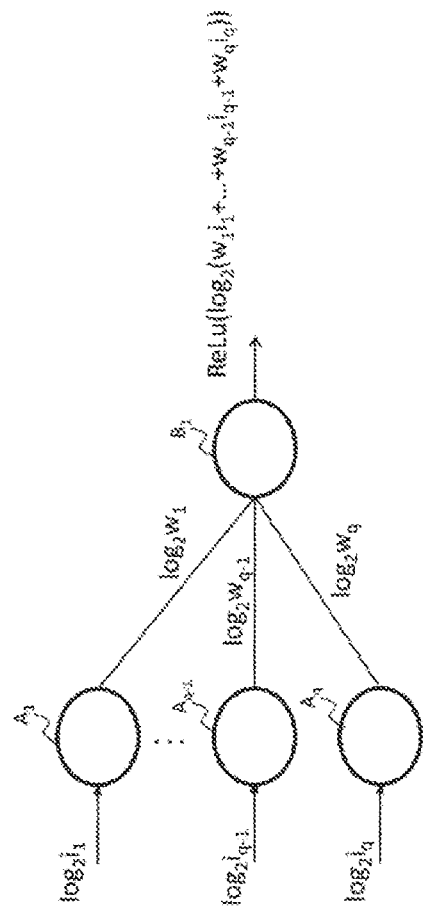
FIG. 5 is a diagram for describing an example of an arithmetic processing at a node.

FIG. 5 is a diagram for describing an example of arithmetic processing in an intermediate node $B_1$. It is assumed that the logarithmic weighting factors that are set between the intermediate node $B_1$ and the input nodes $A_1$ to $A_q$ are $\log_2 w_1$ to $\log_2 w_q$. It is assumed that the data inputted from the input nodes $A_1$ to $A_q$ to the intermediate node $B_1$ are $\log_2 i_1$ to $\log_2 i_q$.

In this case, the calculated value ($X'_{B1}$) and the output value ($Y'_{B1}$) of the activation function at the intermediate node $B_1$ are given by the following expressions. In the example in FIG. 5, the ReLU function is used as the activation function.

[Math. 6]

$$X'_{B1} = \log_2\left(\sum_{k=1}^{q} w_i i_k\right) \quad (6\text{-}1)$$

$$Y'_{B1} = f\left(\log_2\left(\sum_{k=1}^{q} w_i i_k\right)\right) \quad (6\text{-}2)$$

The same operation as the intermediate node $B_1$ is also performed at the intermediate nodes $B_2$ to $B_j$.

In order to understand Expression (6-1) by comparing it with Expression (2-1), the calculated value ($\log_2$ addition value) at the node in the neural network according to Embodiment 1 corresponds to a value generated by converting the calculated value (product-sum value) at a node in a conventional neural network into $\log_2$.

The arithmetic processing at the output nodes $C_1$ to $C_n$ is the same as that at the intermediate nodes, except that the data inputted from the layer in the previous stage is the output value from each intermediate node. Since the output value of the intermediate node is a base 2 logarithm, $\log_2$ addition can be performed at the output nodes, just like the case of the intermediate nodes.

For example, in the case where the activation function at an intermediate node is ReLU, and the calculated value is more than 0, this calculated value is directly outputted, hence the output value of ReLU is a base 2 logarithm. If the calculated value is 0 or less, 0 is outputted, but $0=\log_2 1$, then the output value in this case is also a base 2 logarithm. Therefore an arithmetic operation, the same as the case of the intermediate nodes, can be performed at the output nodes as well.

The arithmetic processing unit 19 performs a determination processing based on the output values (base 2 logarithm) of the output nodes $C_1$ to $C_n$, and outputs the result of the determination processing as the result of image recognition. Details on the determination processing is the same as the determination processing of the conventional neural network described above. For example, a class is assigned to each output node, and a class of an output node which outputted the largest output value is regarded as the result of the image recognition. Another possible method is the above mentioned method of comparing the output value of each output node with a threshold. In the case of comparing with a threshold, a value generated by converting the threshold into a base 2 logarithm (logarithmic threshold) may be used. Then comparison between logarithms becomes possible. The logarithmic threshold is stored in advance in the data storage unit 18, or in the internal buffer of the arithmetic processing unit 19.

Therefore in the neural network according to Embodiment 1, the multiplication operation is not necessary at the intermediate nodes and the output nodes, hence multiplication circuits are not required, and circuit scale is decreased. Further, the arithmetic operation amount is reduced, which means that power consumption is reduced.

A configuration example of a circuit to perform $\log_2$ addition efficiently ($\log_2$ addition circuit) will be described. Here the $\log_2$ addition of $\log_2(i_1*w_1)$ and $\log_2(i_2*w_2)$ can be approximated by the following expression (see NPL 1).

[Math. 7]

$$\log_2(i_1*w_1 + i_2*w_2) = \max(\log_2(i_1*w_1), \log_2(i_2*w_2)) + 2^{-|\log_2(i_1*w_1)-\log_2(i_2*w_2)|} \quad (7)$$

The first term in Expression (7) indicates the larger value out of $\log_2(i_1*w_1)$ and $\log_2(i_2*w_2)$. The second term is 2 exponentiated by a minus absolute value of the difference between $\log_2(i_1*w_1)$ and $\log_2(i_2*w_2)$. The second term is equivalent to bit-shifting 1 to the right (direction of smaller digit) by the absolute value of the difference. In other words, a bit string, expressing the decimal 1 in bits, is bit-shifted by $|\log_2(i_1*w_2)-\log_2(i_1*w_1)|$. The bit shift is performed to the right side because the exponent of the exponentiation of 2 is a negative value. For example, in the case where 1 is expressed as 00001000, if the absolute value of the above mentioned difference is 3, a 3 bit-shift is performed to be 00000001. The role of bit notation may be arbitrarily determined, and the above is merely an example.

As described above, $\log_2$ addition can be performed by selecting the largest value, calculating the absolute value of the difference, and shifting bits, hence arithmetic operation is simple. Further, if the value of $|\log_2(i_1*w_2)-\log_2(i_1*w_1)|$ is not an integer, the value may be approximated to an integer using rounding processing (round-up processing or round-down processing), a ceiling function, a floor function, or the like. Each of $\log_2(i_1*w_2)$ and $\log_2(i_1*w_1)$ may be approximated to an integer respectively first, and then $|\log_2(i_1*w_2)-\log_2(i_1*w_1)|$ may be calculated.

Figure 6:
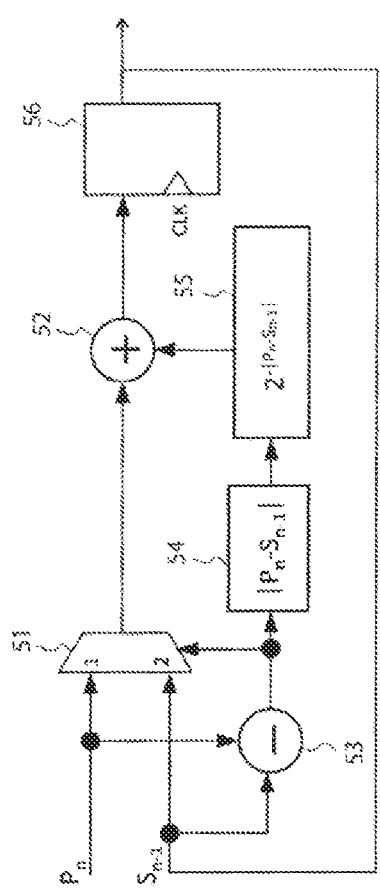
FIG. 6 is a block diagram depicting an example of a $\log_2$ addition circuit.

FIG. 6 is a block diagram depicting an example of a log$_2$ addition circuit. The log$_2$ addition circuit is included in the arithmetic processing unit 19. In this example of the circuit configuration, log$_2$(i$_n$*w$_n$) (n is an integer in the 1 to q range), calculated by adding the logarithmic pixel data and the logarithmic weight for each of the plurality of input nodes A$_1$ to A$_n$, is accumulated. The circuit in FIG. 6 includes a selector 51, an adder 52, a subtractor 53, an absolute value arithmetic unit 54, an exponentiation arithmetic unit 55, and a flip-flop circuit 56.

The selector 51 includes a first input terminal and a second input terminal. log$_2$(i$_n$*w$_n$), to be a new calculation target, is inputted to the first input terminal, and this is regarded as data P$_n$. The value log$_2$(i$_1$*w$_1$+ . . . i$_{n-1}$*w$_{n-1}$), determined by the accumulation thus far, is inputted to the second input terminal, and this is regarded as the data S$_{n-1}$. Initially log$_2$(i$_2$*w$_2$)(=P$_2$) is inputted to the first input terminal, then log$_2$(i$_1$*w$_1$)(=S$_1$) is inputted, to the second input terminal.

The data P$_n$ and the data S$_{n-1}$ are also inputted to the subtractor 53. The subtractor 53 subtracts S$_{n-1}$ from P$_n$. The output of the subtractor 53 is connected to a control terminal of the selector 51. The subtractor 53 outputs a signal, which indicates a sign of the subtraction result, to the control terminal of the selector 51, and outputs a signal, which indicates the subtraction result, to the absolute value arithmetic unit 54. The selector 51 outputs the data P$_n$ if the subtraction result indicates positive, and outputs the data S$_{n-1}$ if the subtraction result indicates negative. In other words, the larger of data P$_n$ and the data S$_{n-1}$ is outputted. The subtractor 53 may be configured to subtract P$_n$ from S$_{n-1}$, and in this case, the selector 51 outputs data S$_{n-1}$ if the subtraction result indicates positive, and outputs data P$_n$ if the subtraction result indicates negative.

The absolute value arithmetic unit 54 is connected to the output of the subtractor 53, and calculates the absolute value |P$_n$–S$_{n-1}$| of the subtraction result generated by the subtractor 53.

The exponentiation arithmetic unit 55 is connected to the output of the absolute value arithmetic unit 54, and calculates 2 to −|P$_n$–S$_{n-1}$|. This calculation can be implemented by bit-shifting 1 to the right by |P$_n$–S$_{n-1}$|, as mentioned above.

The adder 52 is connected to the output of the selector 51 and the output of the exponentiation arithmetic unit 55, and adds the value selected by the selector 51 and the value after the bit-shift is performed in the exponentiation arithmetic unit 55.

The flip-flop circuit 56 is connected to the output of the adder 52, and internally stores the addition result of the adder 52 (approximate value of log$_2$(i$_1$*w$_1$+i$_2$*w$_2$). The flip-flop circuit 56 is connected to a second input terminal of the selector 51, and feeds back the above value to the second input terminal and the subtractor 53 as data S$_2$. log$_2$(i$_3$*w$_3$), to be the next calculation target, is inputted to the first input terminal of the selector 51 as the data P$_3$. By repeating this processing in the same manner thereafter, log$_2$ addition is cumulatively performed for log$_2$(i$_n$*w$_n$), and finally an approximate value of log$_2$(i$_1$*w$_1$+ . . . i$_q$*w$_q$) is outputted from the flip-flop circuit 56, which operates based on the clock CLK. The output value of the flip-flop circuit 56 becomes an input variable of the activation function.

Figure 7:
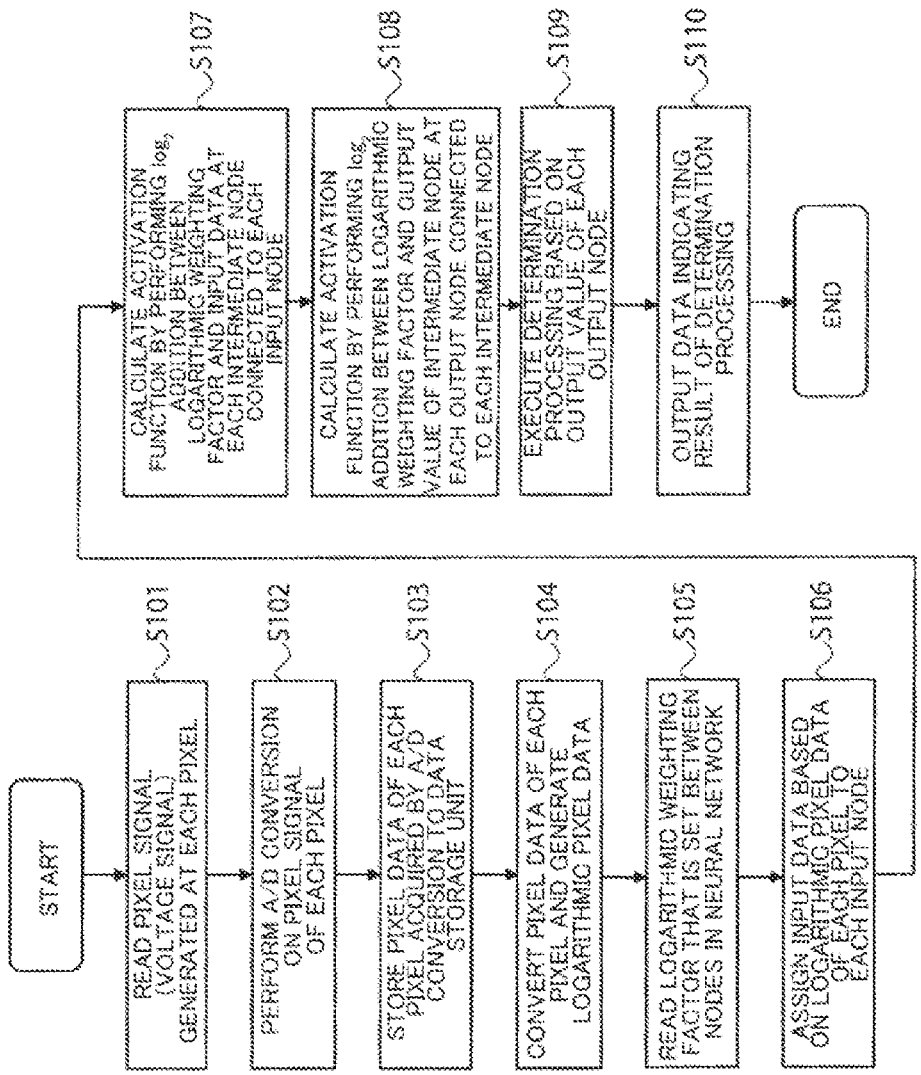
FIG. 7 is a flow chart of an example of an operation of the solid-state imaging apparatus according to Embodiment 1 of the present disclosure.

FIG. 7 is a flow chart of an example of an operation of the solid-state imaging apparatus according to Embodiment 1. When a predetermined event is established in a device equipped with the present apparatus, a trigger to execute this processing is generated. The predetermined event may be any event that is generated or detected by the device equipped with the present apparatus. For example the event may be: a user operating the device equipped with the present apparatus performed a predetermined operation; a predetermined time has elapsed; a predetermined value or higher vibration is detected, and the like, but the event is not limited to these examples. By this trigger, one frame of an image is captured by the pixel array unit 11, under the control of the control unit 15. In other words, in each pixel 21, a pixel signal (voltage signal), which logarithmically changes with respect to the light quantity of the incident light, is generated by the photoelectric conversion, and the generated pixel signal is read and sent to the signal processing unit 16 (S101). These pixel signals are A/D-converted by the column processing unit 13 (S102), and a set of pixel data of each pixel acquired by the A/D conversion is stored in the data storage unit 18 as image data (S103).

The arithmetic processing unit 19 reads image data from the data storage unit 18 and performs data conversion on each pixel data included in the image data (S104). The data conversion operation multiplies the data by log$_2$e/A, for example (see Expression (5-1) and Expression (5-2)). In other words, the value of the pixel data is multiplied by a logarithm of which anti-logarithm is a Napier's constant (predetermined value). Thereby the value of the pixel data is converted into a base 2 logarithm, and this converted data (log$_2$i) becomes the logarithmic pixel data (S104).

The arithmetic processing unit 19 reads a logarithmic weighting factor (log$_2$ weighting factor), which is a logarithm of the weight factor that is set between each node in the neural network, from the data storage unit 18 (S105). The phrase "between each node" refers to "between an input node and an intermediate node" and "between an intermediate node and an output node". If a plurality of intermediate layers exist, "between intermediate nodes of different intermediate layers" is included in the [meaning of "between each node"]. The logarithmic weighting factor may be stored in the internal buffer of the arithmetic processing unit 19 in advance, instead of the data storage unit 18. In the following description, it is assumed that the neural network has one intermediate layer (see FIG. 4), but a case of a neural network having a plurality of intermediate layers is also possible. In this case, in the intermediate layer in the second or later stage, the data is inputted from the intermediate node in the intermediate layer in the previous stage, instead of from the input node, and the content of processing is the same as the case of the intermediate layer in the first stage.

The arithmetic processing unit 19 assigns the logarithmic pixel data of each pixel 21 to each input node of the neural network as the input data (S106). Correspondence between a specific pixel 21 and a specific input node is determined in advance during learning. Corresponding a pixel 21 and an input node one-to-one is merely an example, and the input data that is assigned to each input node may be generated by another method.

For example, a pixel group is formed by a predetermined number of pixels 21, and each pixel group is corresponded to each input node. A representative value of the logarithmic pixel data is determined for the pixel group, and the representative value is assigned to the input node as the input data. The representative value may be any statistical value, such as a mean value, a maximum value and a minimum value. The pixel data of the difference between the logarithmic pixel data which was read this time, and the logarithmic pixel data which was read the last time, may be assigned to the input node as the input data.

The arithmetic processing unit 19 performs an arithmetic operation for each intermediate node based on the input data assigned to each input node and the logarithmic weighting factor that is set between each intermediate node and each input node (S107). In other words, for each input node, the logarithmic weighting factor and input data are added, and $\log_2$ addition is performed for all the addition results. The arithmetic processing unit 19 calculates the activation function using the $\log_2$ addition value as the input variable (S107). The output value of the activation function is regarded as the output value of each intermediate node. The output value of each intermediate node becomes data that is inputted to the output layer in a subsequent stage.

Then [the arithmetic processing unit 19] performs arithmetic operation for each output node based on the output value of each intermediate node and the logarithmic weighting factor that is set between each intermediate node and each output node (S108). In other words, for each intermediate node, the logarithmic weighting factor and data to be inputted are added, and $\log_2$ addition is performed for all the addition results. The arithmetic processing unit 19 calculates the activation function using the $\log_2$ addition value as the input variable (S108). The output value of the activation function becomes the output value of the output node.

The arithmetic processing unit 19 performs determination processing based on the output value of each output node (S109). For example, an output node for which the largest output value was calculated is specified, and the class assigned to the specified output node is acquired as the result of image recognition. As mentioned above, various other algorithms can be used for the determination recognition, such as processing using a threshold. Any algorithm can be used. The arithmetic processing unit 19 stores data that indicates the result of image recognition to the data storage unit 18.

The CPU 17 reads the data, which indicates the result of image recognition, from the data storage unit 18 and outputs the data (S110). For example, the data is outputted to an application program that is executed by the device equipped with the present apparatus. In this case, the application program performs processing in accordance with the result indicated by this data. The data which indicates the result of image recognition may be displayed on a screen of a display included in the device equipped with the present apparatus.

The above mentioned sequence of steps is an example, and the sequence of some steps may be reversed. For example, the sequence of steps S104 and S105 may be reversed.

As described above, according to Embodiment 1, the data of the pixel signals (voltage signals) read from the logarithmic pixels is converted, thereby input data of the base 2 logarithm is generated. Since the circuit to perform conversion to the base 2 logarithm ($\log_2$ conversion circuit) is unnecessary, the circuit scale can be decreased and power consumption can also be reduced.

In Embodiment 1, data of pixel signals read from the logarithmic pixels is used, hence the high dynamic range characteristic of the logarithmic pixels can be utilized in the image recognition. In the case of prior art, the data of the pixel signals read from the linear pixels is converted into base 2 logarithms by the $\log_2$ conversion circuit, but in this case, the dynamic range of the converted data is limited to the dynamic range of the linear pixels. Therefore the effect of the high dynamic range is not acquired. In Embodiment 1, on the other hand, the data is read from the logarithmic pixels, hence the effect of the high dynamic range can be acquired.

Further, according to Embodiment 1, the logarithmic pixel data (base 2 logarithm) converted from the pixel data and the logarithmic weighting factors (base 2 logarithm) are used, hence addition can be used for the arithmetic operation at each node. This means that the multiplication (multiplication of the weighting factor and input data) at each node is unnecessary. Therefore an arithmetic operation amount decreases and power consumption can be reduced. Furthermore, the circuit scale can be decreased since a multiplication circuit is not required.

Modification 1

In Embodiment 1, the base 2 logarithm is used, but the base of the logarithm need not be 2. Even in a case where the base is not 2, addition operation can be performed in the logarithmic region at each node, whereby the arithmetic operation amount can be reduced.

Modification 2

The configuration of the logarithmic pixel indicated in Embodiment 1 (FIG. 3) is an example, and various modifications are possible. A modification of the logarithmic pixel will be described with reference to FIG. 8.

Figure 8:
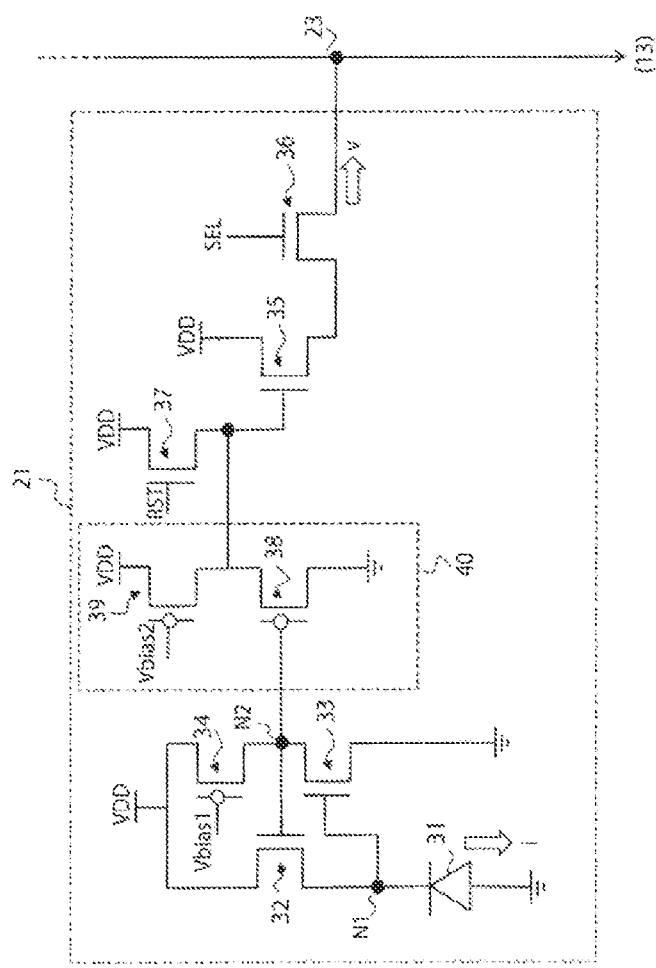
FIG. 8 is a diagram depicting a modification of the circuit configuration of the logarithmic pixel.

FIG. 8 is a circuit diagram depicting a modification of the logarithmic pixel. Here as the pixel transistors, a reset transistor 37, a buffer transistor 38 and a bias transistor 39 are added to the logarithmic pixel in FIG. 3. The buffer transistor 38 and the bias transistor 39 constitute a buffer circuit 40. The reset transistor 37 is an N-type transistor, for example. The buffer transistor 38 and the bias transistor 39 are P-type transistors, for example.

The connection node N2 is connected to the gate terminal of the output transistor 32 and a gate terminal of the buffer transistor 38. The voltage signal generated in the connection node N2 is provided to the amplification transistor 35 via the buffer circuit 40. This voltage signal is amplified by the amplification transistor 35.

The bias transistor 39 and the buffer transistor 38 are connected in series between the power supply voltage and the reference voltage. Bias voltage Vbias2 is applied to a gate terminal of the bias transistor 39. The connection node of the bias transistor 39 and the buffer transistor 38, which is the output terminal of the buffer circuit 40, is connected to a source terminal of the reset transistor 37 and the gate terminal of the amplification transistor 35. A drain terminal of the reset transistor 37 is connected to the power supply voltage. A gate terminal of the reset transistor 37 is connected to the pixel drive line 22.

The reset transistor 37 is controlled by a reset signal RST supplied by the vertical drive unit 12. In the state where the reset transistor 37 is ON, the signal processing unit 16 or the column processing unit 13 performs correlated double sampling (CDS) processing that detects signals which do not include pixel signals, and removes (subtracts) the detected signals from the pixel signals. Thereby a fixed pattern noise, which is generated by irregularities of pixel transistors or the like, is removed. The pixel signals may be read before or after reading the signals that do not include pixel signals. The signals acquired by the CDS processing can be used as the pixel signals read from the logarithmic pixels. The buffer circuit 40 functions to suppress such that the potential (potential of node N2) of the logarithmic pixels is less affected during reset. Thereby the potential of the logarithmic pixels can be constantly outputted depending on the light quantity. It is possible not to perform the CDS processing, even if the circuit configuration in FIG. 8 is used.

According to Modification 2, the fixed pattern noise included in the pixel signals can be removed by performing the CDS processing.

Modification 3

Figure 9:
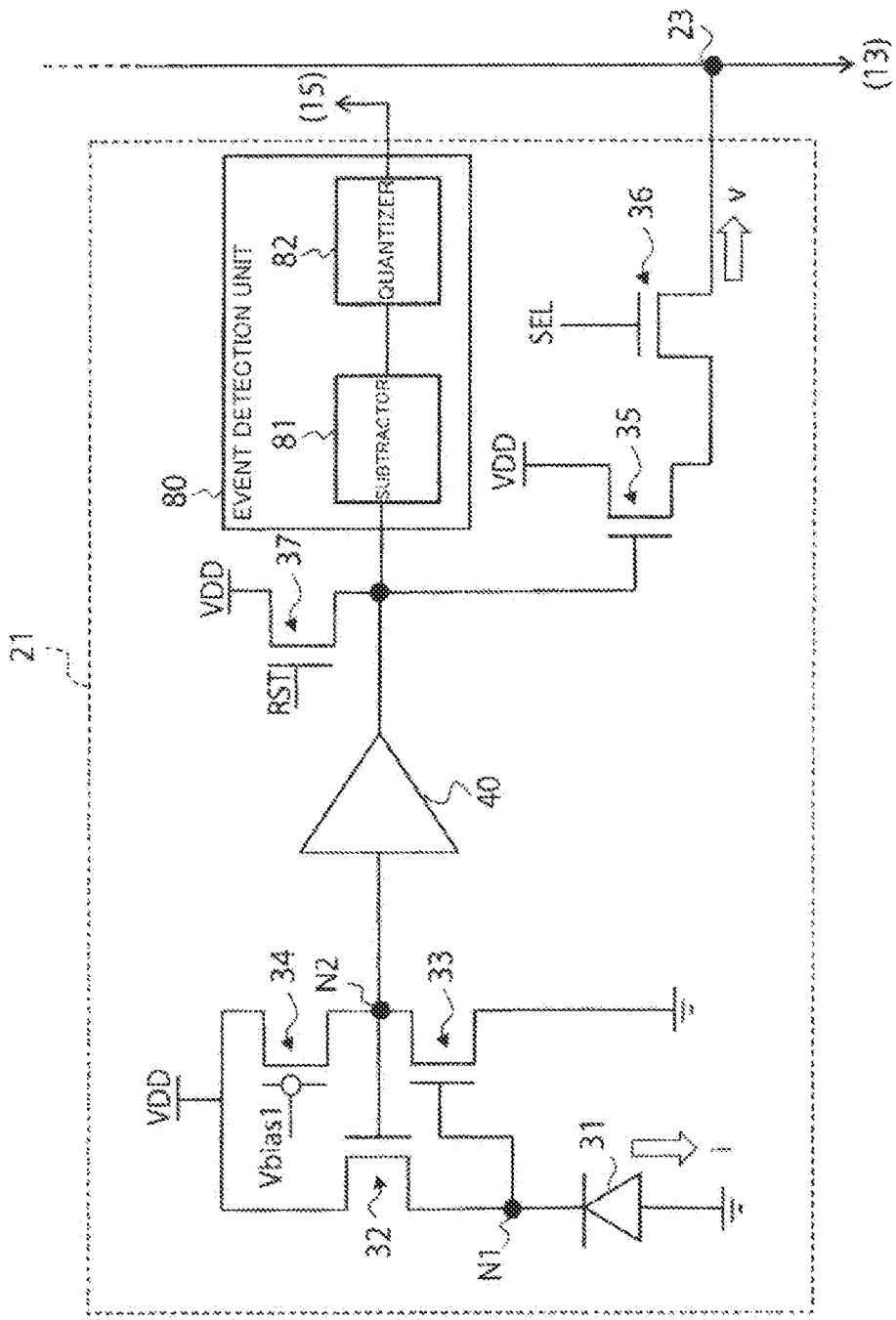
FIG. 9 is a diagram depicting another modification of the circuit configuration of the logarithmic pixel.

FIG. 9 is a circuit diagram depicting another modification of the logarithmic pixel. Here an event detection unit 80 is added to the circuit configuration in FIG. 8. The pixel circuit, in which the event detection unit 80 is added, is referred to as a "dynamic vision sensor (DVS) circuit" in some cases. The configuration of the buffer circuit 40 is simply indicated here using the circuit symbol. The event detection unit 80 detects whether an event is generated depending on whether the change amount of the photoelectric current from the photodiode 31 exceeded a predetermined threshold. The event is, for example, an ON event that is detected when the change amount exceeds the upper limit threshold, an OFF event detected when the change amount is lower than the lower limit threshold, or both an ON event and an OFF event. Detecting the ON event or the OFF event corresponds to detecting the change of contrast (e.g. detecting an object), for example. The event detection unit 80 outputs a detection signal or a non-detection signal to the control unit 15, depending on whether an event is detected or not.

The event detection unit 80 includes a subtractor 81 and a quantizer 82. The subtractor 81 is connected to the output terminal of the buffer circuit 40. The quantizer 82 is connected to the output terminal of the subtractor 81. The event detection unit 80 may be added to the circuit configuration in FIG. 3.

The subtractor 81 drops the level of the voltage signal from the buffer circuit 40 in accordance with the drive signal from the vertical drive unit 12. The subtractor 81 supplies the dropped voltage signal to the quantizer 82.

The quantizer 82 quantizes the voltage signal from the subtractor 81 to digital signals. The quantizer 82 compares the quantized signal with the threshold voltage Vth, and generates a signal that indicates the comparison result (detection signal or non-detection signal). For example, in the case where the threshold voltage Vth is the upper limit threshold, the detection signal is generated if the quantized signal is larger than the upper limit threshold, and the non-detection signal is generated if the quantized signal is the upper limit threshold or less. The quantizer 82 outputs the generated detection signal or the non-detection signal to the control unit 15. In the case where the threshold voltage Vth is the lower limit threshold as well, the detection signal or the non-detection signal can be generated in the same manner.

In the case where the detection signal is inputted, the control unit 15 determines to read the pixel signals from the logarithmic pixel 21, and controls the vertical drive unit 12 so as to read the pixel signals from the logarithmic pixel 21. In the case where the non-detection signal is inputted, on the other hand, the control unit 15 determines not to read the pixel signals from the logarithmic pixel 21. In the case where an event is not detected, the quantizer 82 may omit outputting the non-detection signal to the control unit 15.

Figure 10:
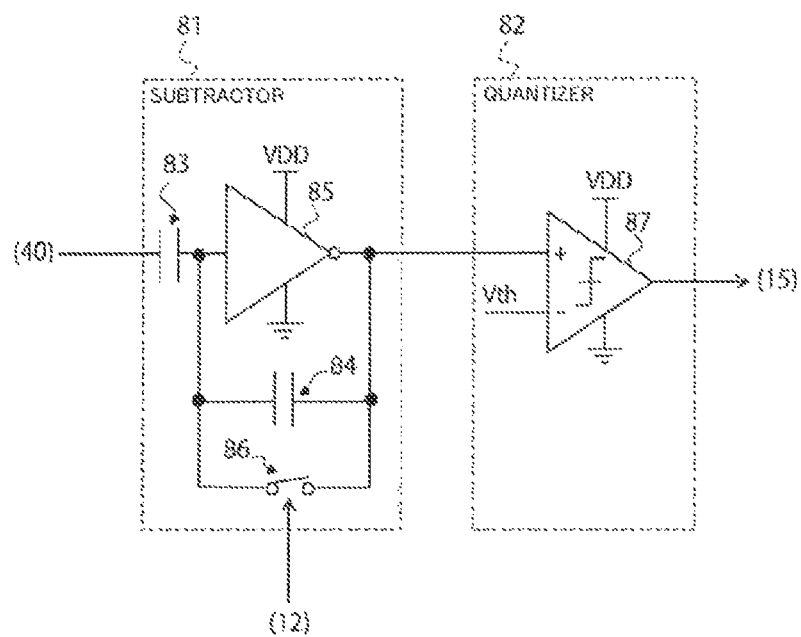
FIG. 10 is a diagram depicting an example of a circuit configuration of a subtractor and a quantizer.

FIG. 10 is a circuit diagram depicting a configuration example of the subtractor 81 and the quantizer 82. The subtractor 81 includes a capacitor 83, a capacitor 84, an inverter 85 and a switch 86. The quantizer 82 includes a comparator 87.

One end of the capacitor 83 is connected to the output terminal of the buffer circuit 40, and the other end is connected to the input terminal of the inverter 85. The capacitor 84 is connected in parallel with the inverter 85. The switch 86 connects both ends of the capacitor 84. The switch 86 performs switching in accordance with the drive signal from the vertical drive unit 12.

The inverter 85 inverts a voltage signal that is inputted via the capacitor 83. The inverter 85 outputs the inverted signal to a non-inversion input terminal (+) of the comparator 87.

When the switch 86 is turned ON, the voltage signal Vinit is inputted to the buffer circuit 40 side of the capacitor 83, and the opposite side of the capacitor 83 becomes a virtual ground terminal. The potential of this virtual ground terminal is assumed to be zero for convenience. If the capacitance of the capacitor 83 at this time is C1, the change Qinit stored in the capacitor 83 is given by the following expression. The charge stored in the capacitor 84, on the other hand, is zero, since both ends of the capacitor 84 are short circuited.

$$Qinit = C1 \times Vinit \tag{8-1}$$

Then the switch 86 is turned OFF and the voltage on the buffer circuit 40 side of the capacitor 83 changes to Vafter. At this time, the charge Qafter, stored in the capacitor 83, is given by the following expression.

$$Qafter = C1 \times Vafter \tag{8-2}$$

The charge Q2 stored in the capacitor 84, on the other hand, is given by the following expression where the output voltage is Vout.

$$Q2 = C2 \times Vout \tag{8-3}$$

The total charge amount of the capacitor 83 and the capacitor 84 does not change, hence the following expression is established.

$$Qinit = Qafter + Q2 \tag{8-4}$$

If Expression (8-1) to Expression (8-3) are substituted in Expression (8-4) and transformed, then the following expression is acquired.

$$Vout = -(C1/C2) \times (Vafter - Vinit) \tag{8-5}$$

Expression (8-5) indicates the subtraction operation of the voltage signal, and the gain in the subtraction result is C1/C2. Normally maximizing gain is desired, hence it is preferable to design C1 to be large and C2 to be small. However if C2 is too small, kTC noise increases and the noise characteristic may worsen, hence the decrease in capacitance of C2 is limited to a range where noise is allowable.

The comparator 87 compares the voltage signal from the subtractor 81 and the threshold voltage Vth that is applied to the inversion input terminal (−). In accordance with the comparison result, the comparator 87 outputs a detection signal or a non-detection signal.

According to Modification 3, the pixel signals are read when the event detection unit 80 detects an event, therefore pixel data can be generated at high-speed.

Embodiment 2

In Embodiment 2, two types of pixels (logarithmic pixels and linear pixels) are used as the pixels disposed in the pixel array unit 11. Then the pixels from which the pixel signals are read are selected between the logarithmic pixels and the linear pixels in accordance with the externally provided indication data. In the case of reading the pixel signals from the logarithmic pixels, the subsequent processing is the same as Embodiment 1. In the case of reading the pixel signals from the linear pixels, the subsequent processing is the same as the arithmetic processing of a conventional neural network. In other words, at each node (intermediate node and output node), the product-sum operation is performed based on the pixel data of each pixel and the weighting factor, and the activation function is calculated using the result of the product-sum operation as the input variable. Embodiment 2 will be described in detail.

Figure 11:
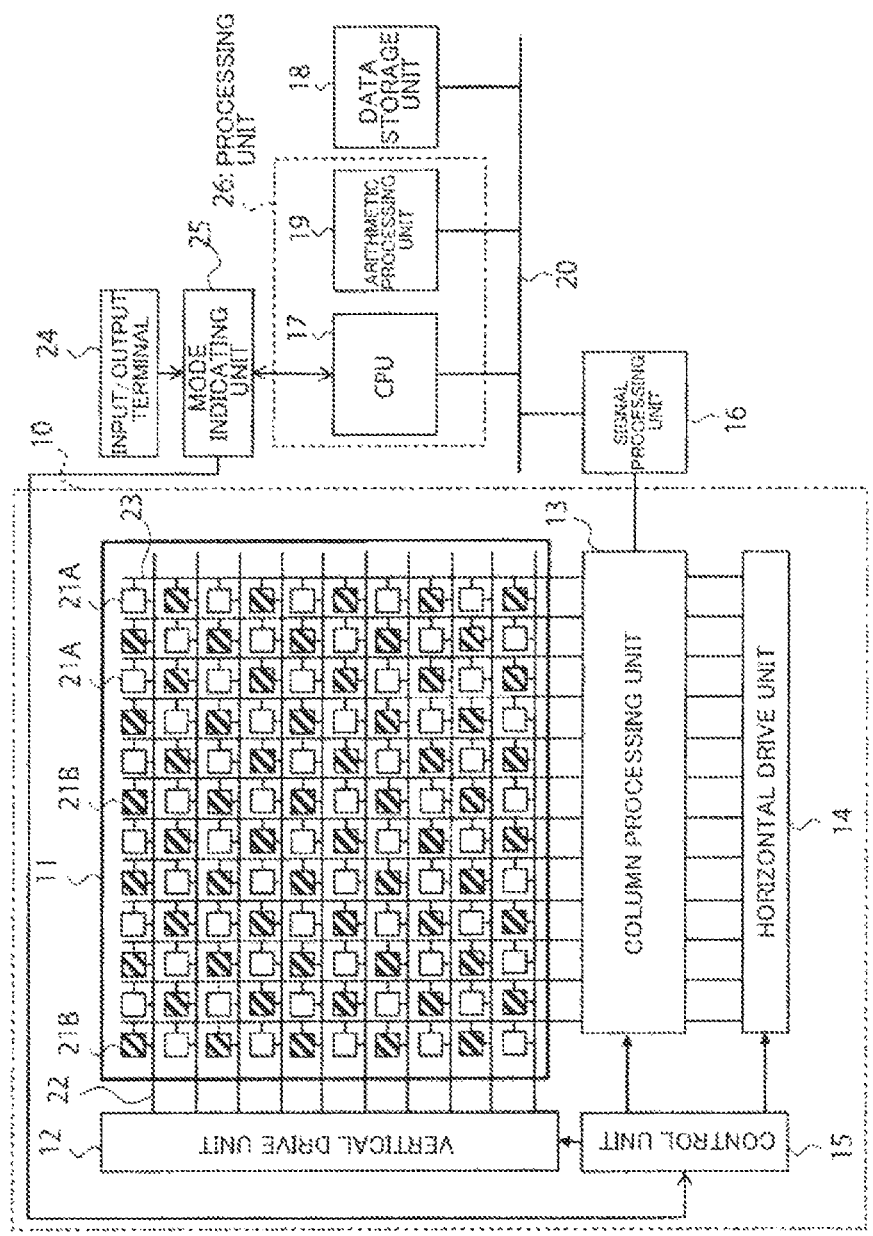
FIG. 11 is a block diagram depicting a configuration example of a solid-state imaging apparatus according to Embodiment 2 of the present disclosure.

FIG. 11 is a block diagram depicting a configuration example of a solid-state imaging apparatus according to Embodiment 2 of the present disclosure. Here an input/output terminal 24 and a mode indicating unit 25 are added to the solid-state imaging apparatus in FIG. 1. An element of which name is the same in FIG. 1 is denoted with the same reference sign, and detailed description thereof is omitted except for an expanded or changed processing.

The pixel array unit 11 includes two types of pixels (logarithmic pixel 21A and linear pixel 21B). The linear pixel 21B corresponds to an example of the second pixel of which type is different from the logarithmic pixel 21A. A pixel signal read from the linear pixel 21B corresponds to a second pixel signal, which is read from the second pixel.

The logarithmic pixel 21A and the linear pixel 21B are alternately disposed in the horizontal and vertical directions (disposed in a checkerboard pattern). The disposition, however, is not limited to this and may be any disposition. For example, in each square pixel block constituted of two pixels vertically and two pixels horizontally, three pixels in the pixel block may be the logarithmic pixels, and the other one pixel may be the linear pixel. Further, the same type of pixels may be disposed in each column, and different types of pixels may be disposed alternately in the row direction (horizontal direction).

As described in Embodiment 1, the linear pixel generates an electric signal as a pixel signal that linearly changes with respect to the incident light. In other words, the linear pixel generates an output signal that increases linearly with respect to the light quantity. Compared with the logarithmic pixel, the linear pixel has a narrower dynamic range but has a lower noise characteristic.

Figure 12:
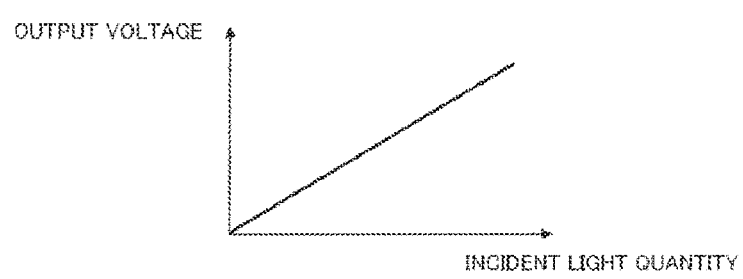
FIG. 12 is a graph schematically expressing the characteristic of a linear pixel.

FIG. 12 is a graph schematically expressing the relationship between the light quantity of the incident light that enters a linear pixel and the output voltage. As the light quantity of the incident light increases, the output voltage increases linearly (e.g. proportionally).

Figure 13:
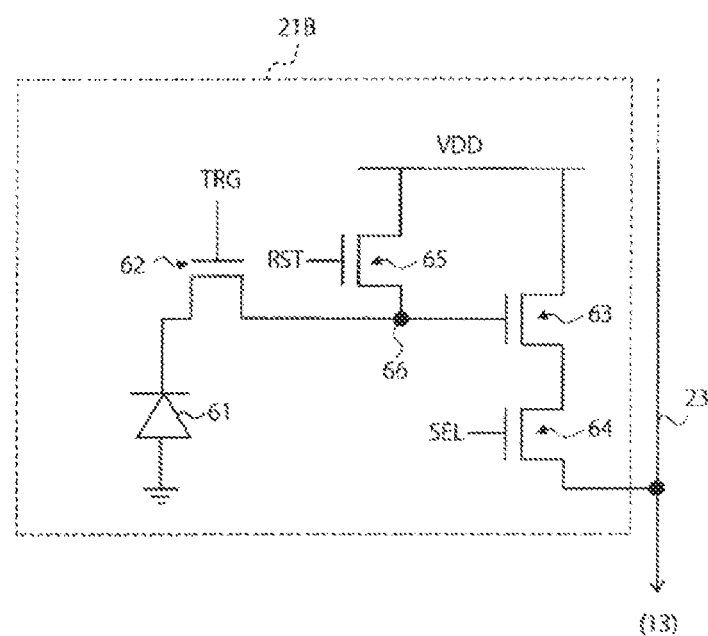
FIG. 13 is a diagram depicting an example of a circuit configuration of the linear pixel.

FIG. 13 indicates an example of a circuit configuration of the linear pixel 21B. Here configuration of one linear pixel 21B is indicated as an example, but each of the other linear pixels 21B has the same configuration.

The linear pixel 21B includes a photodiode 61, which corresponds to the photoelectric conversion unit and a plurality of pixel transistors. The plurality of pixel transistors include a transfer transistor 62, an amplification transistor 63, a selection transistor 64 and a reset transistor 65. These transistors are metal oxide semiconductor (MOS) transistors and are N-type transistors, for example. However these transistors may be P-type transistors. In this case, it is necessary to change the logic of the control signal and the voltage of the power supply line of these pixel transistors.

The photodiode 61 is an element that performs photoelectric conversion to convert the incident light into an electric signal (signal changes) in proportion to the light quantity of the incident light, and stores the electric signal. An anode terminal of the photodiode 61 is connected to the reference voltage, and a cathode terminal thereof is connected to a source terminal of the transfer transistor 62.

The transfer transistor 62 is connected between the cathode terminal of the photodiode 61 and an FD node 66. A gate terminal of the transfer transistor 62 is connected to the vertical drive unit 12. The transfer transistor 62 is controlled by a transfer signal TRG from the vertical drive unit 12. When the transfer transistor 62 turns ON, the signal charges stored in the photodiode 61 are transferred to the FD node 66.

The FD node 66 is a floating diffusion region connected between a drain terminal of the transfer transistor 62 and a gate terminal of the amplification transistor 63. Thereby the FD node 66 can store signal charges transferred from the photodiode 61. The FD node 66 is also connected to a source terminal of the reset transistor 65.

The amplification transistor 63 is connected between the power supply voltage and the selection transistor 64. The gate terminal of the amplification transistor 63 is connected to the FD node 66. The amplification transistor 63 enters a conduction state in accordance with the signal charges stored in the FD node 66.

The selection transistor 64 is connected between the amplification transistor 63 and the vertical signal line 23. A gate terminal of the selection transistor 64 is connected to the vertical drive unit 12. The selection transistor 64 is controlled by the selection signal SEL from the vertical drive unit 12. The selection transistor 64 connects or disconnects the linear pixel 21B to/from the vertical signal line 23. When the selection transistor 64 turns ON, the electric current can be supplied to the amplification transistor 63, and the electric current, in accordance with the conduction state of the amplification transistor 63, is supplied from the power supply voltage. The vertical signal line 23 is set to the voltage of the amplification transistor 63.

The reset transistor 65 is connected between the power supply voltage and the FD node 66. A gate terminal of the reset transistor 65 is connected to the vertical drive unit 12. The reset transistor 65 is controlled by a reset signal RST from the vertical drive unit 12. When the reset transistor 65 is turned ON, the signal charges stored in the FD node 66 are discharged to the power supply voltage. Thereby the FD node 66 of the linear pixel 21B is reset.

In this way, the voltage signal, which is in proportion to the light quantity of the incident light, is outputted as a pixel signal. The configuration of the linear pixel in FIG. 13 is an example, and the configuration of the linear pixel is not limited to the configuration in FIG. 13. Any configuration may be used for the linear signal, as long as the voltage signal in proportion to the light quantity (electric charges) can be detected.

The input/output terminal 24 is a terminal to transmit or receive signals to/from an external apparatus. The input/output terminal 24 transmits or receives signals to/from the external apparatus using an arbitrary communication system, such as serial communication. The external apparatus may be an apparatus that performs the internal settings of a device equipped with this solid-state imaging apparatus, from outside of the device, or may be an operation unit (e.g. buttons) with which the user performs various settings.

The mode indicating unit 25 receives mode data, which indicates the mode of the pixel read processing, via the input/output terminal 24. The pixel read modes include the logarithmic read mode and the linear read mode. In the logarithmic read mode, first read processing, to perform reading from a logarithmic pixel, is executed. In the linear read mode, second read processing, to perform reading from a linear pixel, is executed. The mode data indicates one of these modes. The mode indicating unit 25 is constituted of a storage element, such as a register, for example. The CPU 17 may provide the mode data to the mode indicating unit 25.

The control unit 15 reads the mode data from the mode indicating unit 25, and in the case where the mode data indicates the logarithmic read mode, the control unit 15 controls each unit so that pixel signals are read from each logarithmic pixel 21A in the pixel array unit 11. In the case where the mode data indicates the linear read mode, the control unit 15 controls each unit so that pixel signals are read from each linear pixel 21B in the pixel array unit 11. In other words, the control unit 15 selectively executes the processing to read pixel signals from each logarithmic pixel 21A, or the processing to read pixel signals from each linear pixel 21B.

The column processing unit 13 processes signals, which are outputted from one row of pixels 21, for each pixel column, just like Embodiment 1. For example, the signal processing may include A/D conversion, and may further include at least one of noise removal and amplification of the signals before A/D conversion.

The data storage unit 18 stores parameters of a neural network, which the arithmetic processing unit 19 uses for arithmetic processing of the neural network for the logarithmic read mode and for the linear read mode respectively. The neural network for the logarithmic read mode and the neural network for the linear read mode differ from each other, and learning is performed independently from each other as well.

As a parameter for the neural network for the logarithmic read mode, the data storage unit 18 stores a value generated by converting a weighting factor, which indicates a strength of the connection between each node, into a base 2 logarithm (logarithmic weighting factor) just like Embodiment 1. The logarithmic weighting factor may be stored in the internal buffer of the arithmetic processing unit 19, instead of the data storage unit 18. The neural network for the logarithmic read mode corresponds to the first neural network, for example, and each node in the first neural network corresponds to the first node, for example.

As a parameter of the neural network for the linear read mode, the data storage unit 18 stores a weighting factor, which indicates a strength of the connection between each node. The weighting factor may be stored in the internal buffer of the arithmetic processing unit 19, instead of the data storage unit 18. The neural network for the linear read mode corresponds to the second neural network, for example, and each node in the second neural network corresponds to the first node, for example.

The CPU 17 reads the mode data from the mode indicating unit 25, and in the case where the mode data indicates the logarithmic read mode, the CPU 17 controls the arithmetic processing unit 19 in the same manner as Embodiment 1. In other words, the arithmetic processing unit 19 converts the pixel data of each pixel into the logarithmic pixel data (see Expression (5-2)), and performs the arithmetic processing of the neural network using the logarithmic pixel data and the logarithmic weighting factor between each node. In each intermediate node and each output node, as described in Embodiment 1, the data inputted from the layer in the previous stage and the logarithmic weighting factor are added, and $\log_2$ addition is performed for these addition results (see Expression (6-1)). Using the result of the $\log_2$ addition as the input variable of the activation function, the output value of the activation function is calculated (see Expression (6-2)).

In the case where the mode data indicates the linear read mode, the CPU 17 controls the arithmetic processing unit 19 so that the arithmetic operation similar to the conventional neural network described in Embodiment 1 is performed. In other words, the arithmetic processing unit 19 regards the pixel data of each pixel as the input data of the neural network (second input data), and performs arithmetic processing of the neural network using this input data and the weighting factor between each node. In the intermediate node and the output node, the data inputted from the layer in the previous stage is multiplied by the weighting factor (see Expression (2-1)), and these multiplication results are added. In other words, the product-sum operation is performed for the inputted data and the weighting factor. Then using the result of the product-sum operation as an input variable of the activation function, the output value of the activation function is calculated (see Expression (2-2)).

As described above, the arithmetic processing unit 19 includes both the circuit that performs the arithmetic processing of the neural network for the logarithmic read mode, and the circuit that performs the arithmetic processing of the neural network for the linear read mode.

Here the neural networks for these modes are neural networks that performed learning independently from each other, but the present invention is not limited to this. For example, in a case where the content of the image recognition is the same for these modes, the neural networks that commonly performs learning may be used. In this case as well, the logarithmic pixel data and the logarithmic weighting factor are used in the logarithmic read mode, and the pixel data and the weighting factor are used in the linear read mode. The arithmetic operation in each intermediate node and in each output node is also different depending on the mode, as described above.

Figure 14:
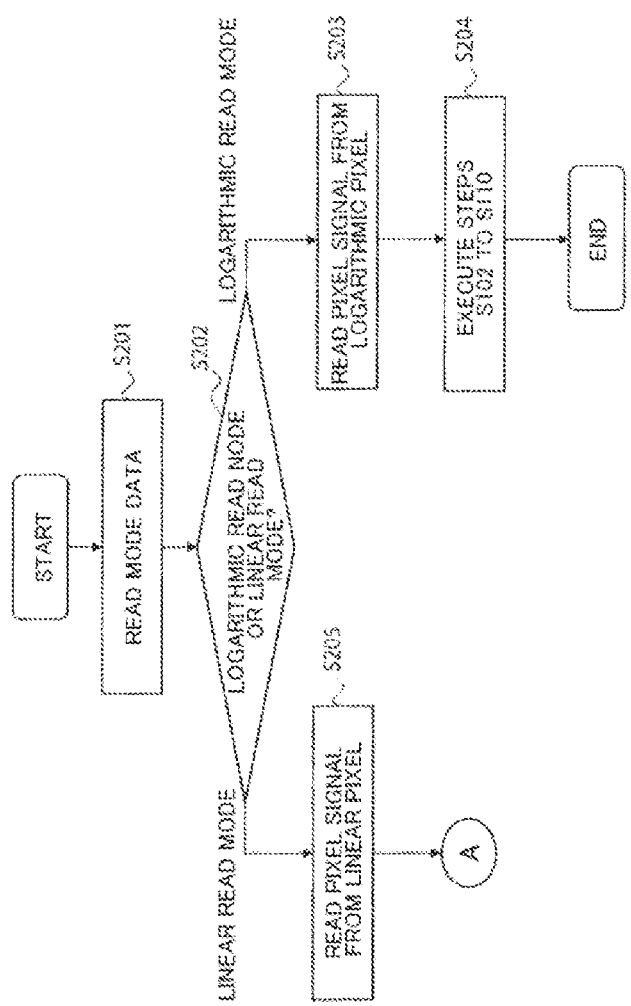
FIG. 14 is a flow chart of an example of an operation of the solid-state imaging apparatus according to Embodiment 2 of the present disclosure.

FIG. 14 is a flow chart of an example of an operation of the solid-state imaging apparatus according to Embodiment 2. The control unit 15 reads the mode data from the mode indicating unit 25 (S201). Then [the control unit 15] checks which one of the logarithm read mode and the linear read mode is indicated by the mode data (S202). In the case where the logarithmic read mode is indicated, the control unit 15 controls each unit so that the pixel signals are read from each logarithmic pixel 21A of the pixel array unit 11 (S203). The subsequent processing is the same as steps S102 to S110 in FIG. 7 (S204).

In the case where the linear read mode is indicated, the control unit 15 controls each unit so that pixel signals are read from each linear pixel 21B in the pixel array unit 11 (S205). The subsequent processing is indicated in FIG. 15.

Figure 15:
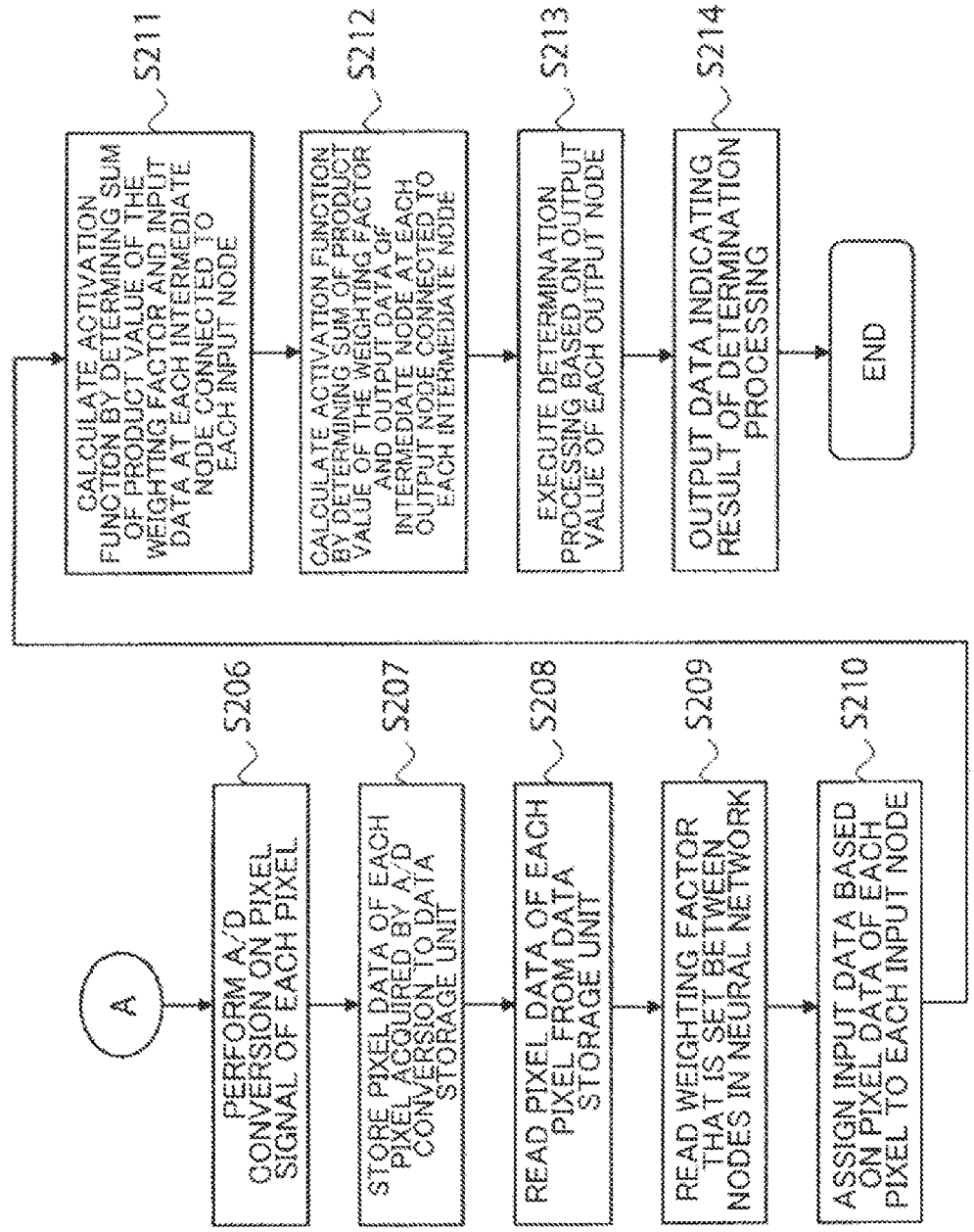
FIG. 15 is a flow chart of the example of the operation continuing from FIG. 14.

FIG. 15 is a flow chart of an example of the operation continuing from step S205 in FIG. 14. Description on the processing of a step that is the same as the flow chart in FIG. 7 will be omitted unless otherwise necessary.

The pixel signal read from each linear pixel 21B is A/D-converted by the column processing unit 13 (S206), and a set of pixel data of each pixel acquired by the A/D conversion is stored in the data storage unit 18 as the image data (S207).

The arithmetic processing unit 19 reads the image data from the data storage unit 18 (S208), and reads the weighting factor, between each node in the neural network for the linear read mode, from the data storage unit 18 (S209).

The arithmetic processing unit 19 assigns the pixel data of each pixel 21 to each input node of the neural network as the input data (S210). Correspondence of a specific pixel 21 with a specific input node is determined in advance during learning. Corresponding a pixel 21 and an input node one-to-one is merely an example, and the input data that is assigned to each node may be generated by another method.

The arithmetic processing unit 19 performs arithmetic operation for each intermediate node based on the input data assigned to each input node and the weighting factor between each intermediate node and each input node (S211). In other words, for each input node, the weighting factor is multiplied by the input data, and the product of the multiplication results is calculated. This means that the product-sum operation of the weighting factor and the input data is performed. The arithmetic processing unit 19 calculates the activation function using the result of the product-sum operation as the input variable (S211). The output value of the activation function is regarded as the output value of each intermediate node. The output value of each intermediate node becomes data that is inputted to the output layer in a subsequent stage.

Then [the arithmetic processing unit 19] performs arithmetic operation for each output node based on the output value of each intermediate node and the weighting factor between each intermediate node and each output node (S212). In other words, the weighting factor for each intermediate node is multiplied by the input data, and the product of the multiplication results is calculated. This means that the product-sum operation of the weighting factor and input data is performed. The arithmetic processing unit 19 calculates the activation function using the result of the product-sum operation as the input variable (S212). The output value of the activation function is regarded as the output value of each output node.

The arithmetic processing unit 19 performs determination processing based on the output value of each output node (S213). For example, an output node, for which the largest output value was calculated, is specified, and the class assigned to the specified output node is acquired as the result of image recognition. The arithmetic processing unit 19 stores the data that indicates the result of image recognition to the data storage unit 18.

The CPU 17 reads the data that indicates the result of image recognition from the data storage unit 18, and outputs the data to an external apparatus (S214). An example of an external apparatus is a processor that executes an application program that is executed in a device equipped with the present solid-state imaging apparatus. The external apparatus may determine whether the read mode is switched or not depending on the result of image recognition. For example, the external apparatus determines that the logarithmic read mode is switched to the linear read mode. The external apparatus writes the mode data, in which the mode to be switched to is specified, to the mode indicating unit 25 via the input/output terminal 24 or the CPU 17. This mode switching will be described below in detail.

As mentioned above, the logarithmic pixel has a higher noise characteristic but has a wide dynamic range compared with the linear pixel; and the linear pixel has a lower noise characteristic but has a narrower dynamic range compared with the logarithmic pixel. By switching between the logarithmic read mode and the linear read mode utilizing such a difference in characteristics, image recognition in accordance with purpose can be performed. For example, the logarithmic read mode is used in order to perform sensing at lower power consumption, and the linear read mode is used in order to accurately identify an object detected during sensing.

For example, whether a face of a person is captured or not is detected using the logarithmic read mode, and if it is detected that the face of a person is captured, the mode is switched to the linear read mode, so as to identify this person (e.g. identify one of a plurality of persons registered in advance). For another example, whether a license plate of a vehicle is captured or not is detected using the logarithmic read mode, and if it is detected that the license plate is captured, the mode is switched to the linear read mode, so as to identify the numbers on the license plate.

Modification 1

The resolution settings (number of bits) of A/D conversion may be changed depending on whether the mode is the logarithmic read mode or the linear read mode. For example, the number of bits in the linear read mode may be set higher than the number of bits in the logarithmic read mode. Specifically, the number of bits of the linear pixel is 10 to 12 bits, and the number of bits of the logarithmic read mode is 8 bits, for example. By decreasing the number of bits, an arithmetic operation amount can be decreased, hence power consumption in the logarithmic read mode can be further reduced. These numeric values are merely examples, and the number of bits in each mode is arbitrary. The number of bits of A/D conversion may be the same between these modes.

Modification 2

In Embodiment 2, an example of using the logarithmic pixel and the linear pixel as the two types of pixels was described, but another type of pixel may be used instead of the linear pixel.

For example, the number of entering photons may be counted and outputted as a pixel signal, that is, a photon-count type pixel (digital pixel) may be used. For the photon-count type pixel, a single photon avalanche diode (SPAD) that can detect entry of a single photon is used. The pixel signal is generated by counting the pulses that are outputted from the SPAD to which photons enter.

For another pixel example, a distant measurement pixel, to measure the distance from a subject, may be used. An example of the distance measurement pixel is a pixel using an indirect time of flight (ITOF) technique. In this pixel, a phase difference, when a pulsed light modulated using a photodiode is reflected, is detected as an electric charge amount, and this is regarded as a pixel signal.

The pixel exemplified here corresponds to an example of the second pixel, which is a different type of pixel from the logarithmic pixel (first pixel). In the case of using this type of pixel, processing performed on the read pixel signal is the same as the case of the linear pixel. In other words, the case of using the pixel exemplified here can be described in the same manner as the description in Embodiment 2, except that the sections for the linear read mode described in Embodiment 2 are regarded as the sections for read mode to read this pixel. For example, the neural network for the linear read mode is regarded as the neural network for the read mode to read this pixel.

Embodiment 3

In Embodiment 2 described above, the logarithmic pixel and the linear pixel exist independently as different pixels, but in Embodiment 3, a pixel having both functions of the logarithmic pixel and the linear pixel (hereafter referred to as a "hybrid pixel") is used.

Figure 16:
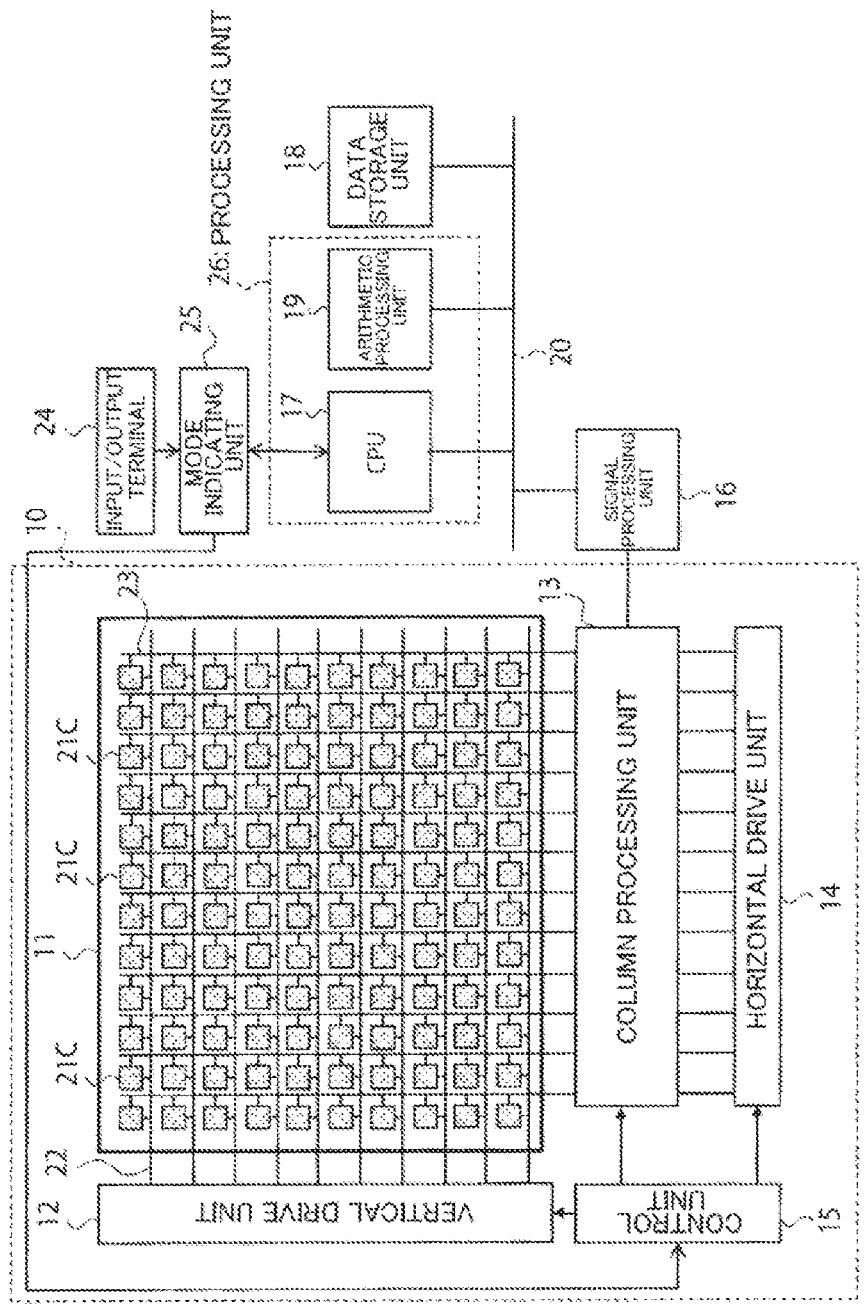
FIG. 16 is a block diagram depicting a configuration example of a solid-state imaging apparatus according to Embodiment 3.

FIG. 16 is a block diagram depicting a configuration example of a solid-state imaging apparatus according to Embodiment 3. Here the logarithmic pixel 21A and the linear pixel 21B in the pixel array unit 11 in FIG. 11 are replaced with the hybrid pixels 21C. The hybrid pixel 21C corresponds to an example of the second pixel, of which type is different from the logarithmic pixel 21A.

Figure 17:
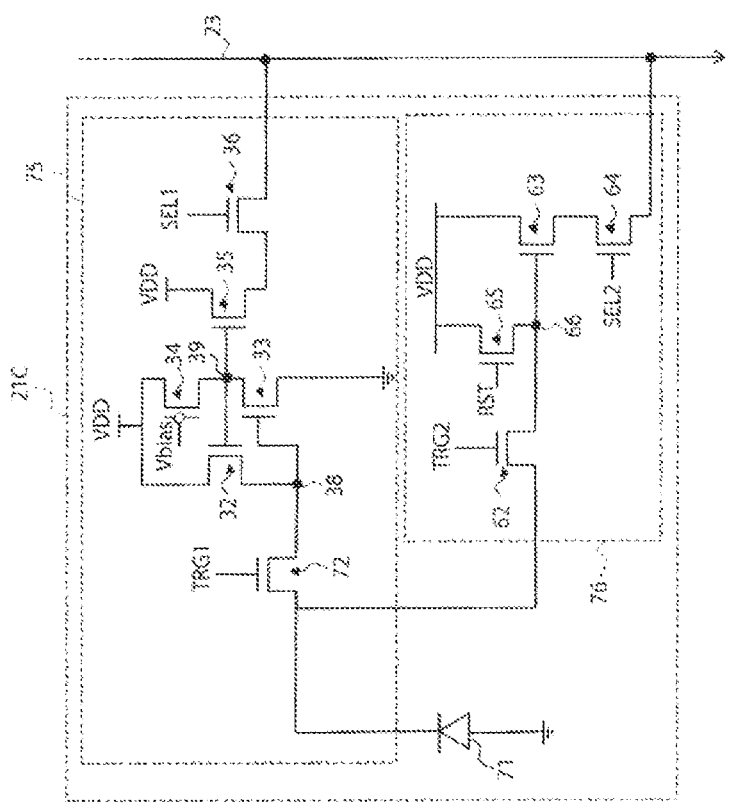
FIG. 17 is a diagram depicting an example of a circuit configuration of a hybrid pixel.

FIG. 17 indicates an example of a circuit configuration of the hybrid pixel 21C. The configuration of the hybrid pixel 21C is basically the configuration of the logarithmic pixel in FIG. 3 and the configuration of the linear pixel in FIG. 13, which are integrated into one pixel. In FIG. 17, an element that is the same as FIG. 3 or FIG. 13 is denoted with a same reference sign. However SEL in FIG. 3 is changed to SEL1, and SEL and TRG in FIG. 13 are changed to SEL2 and TRG2. The difference from the configurations in FIG. 3 and FIG. 13 will be primarily described below.

The hybrid pixel 21C includes a photodiode 71, a logarithmic pixel read unit (first read unit) 75, and a linear pixel read unit (second read unit) 76. The logarithmic pixel read unit 75 corresponds to the configuration of the logarithmic pixel in FIG. 3 (excluding the photodiode 71), and the linear pixel read unit 76 corresponds to the configuration of the linear pixel in FIG. 13 (excluding the photodiode 71). The logarithmic pixel read unit 75 further includes a transfer transistor 72. The transfer transistor 72 is disposed between the photodiode 71 and the connection node N1.

In the hybrid pixel 21C, the photodiode 71 is commonly connected to the logarithmic pixel read unit 75 and the linear pixel read unit 76. The photodiode 71 is commonly used for both the logarithmic read mode and the linear read mode. In the logarithmic read mode in Embodiment 3, reading is performed using the logarithmic pixel read unit 75 (first read processing), and in the linear read mode, reading is performed using the linear pixel read unit 76 (second read processing). A cathode terminal of the photodiode 71 is connected to the source terminal of the transfer transistor 62 and a source terminal of the transfer transistor 72. A drain terminal of the transfer transistor 72 is connected to the connection node N1. A gate terminal of the transfer transistor 72 is connected to the vertical drive unit 12. The transfer transistor 72 is controlled by a transfer signal TRG1 from the vertical drive unit 12. In the case of executing the logarithmic read mode, the transfer transistor 72 is turned ON.

In the case of executing the logarithmic read mode, the control unit 15 keeps the transfer transistor 72 in the ON state, and keeps the transfer transistor 62 in the OFF state. In these states, [the control unit 15] reads the pixel signals using the logarithmic pixel read unit 75. This operation is the same as the reading of the logarithmic pixels described in Embodiment 1.

In the case of executing the linear read mode, on the other hand, the control unit 15 keeps the transfer transistor 72 in the OFF state. In this state, [the control unit 15] reads the pixel signals using the linear pixel read unit 76. This operation is the same as the reading of the linear pixels described in Embodiment 2.

As described above, according to Embodiment 3, the pixel region can be effectively used because the hybrid pixel is used, hence more pixels can be disposed even if the space area is the same.

Modification 1

The configuration of the hybrid pixel 21C in FIG. 17 is an example, and various modifications are possible.

For example, the buffer circuit 40 and the reset transistor 37 in FIG. 8 may be added to the logarithmic pixel read unit 75 in FIG. 17.

Figure 18:
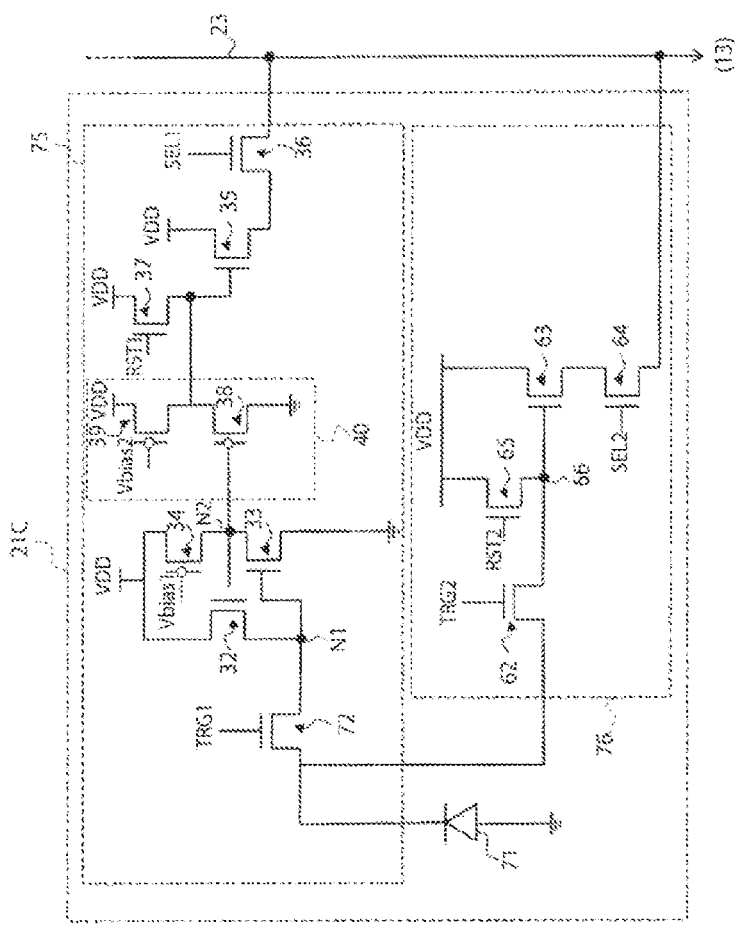
FIG. 18 is a diagram depicting a modification of the circuit configuration of the hybrid pixel.

FIG. 18 is an example of a circuit configuration where the buffer circuit 40 and the reset transistor 37 are added to the logarithmic pixel read unit 75 in FIG. 17. The configurations and operations of the buffer circuit 40 and the reset transistor 37 are the same as those described with reference to FIG. 8. The CDS processing performed using the buffer circuit 40 and the reset transistor 37 is also the same as described with reference to FIG. 8.

Modification 2

The event detection unit 80 in FIG. 9 may be added to the logarithmic pixel read unit 75 in FIG. 17.

Figure 19:
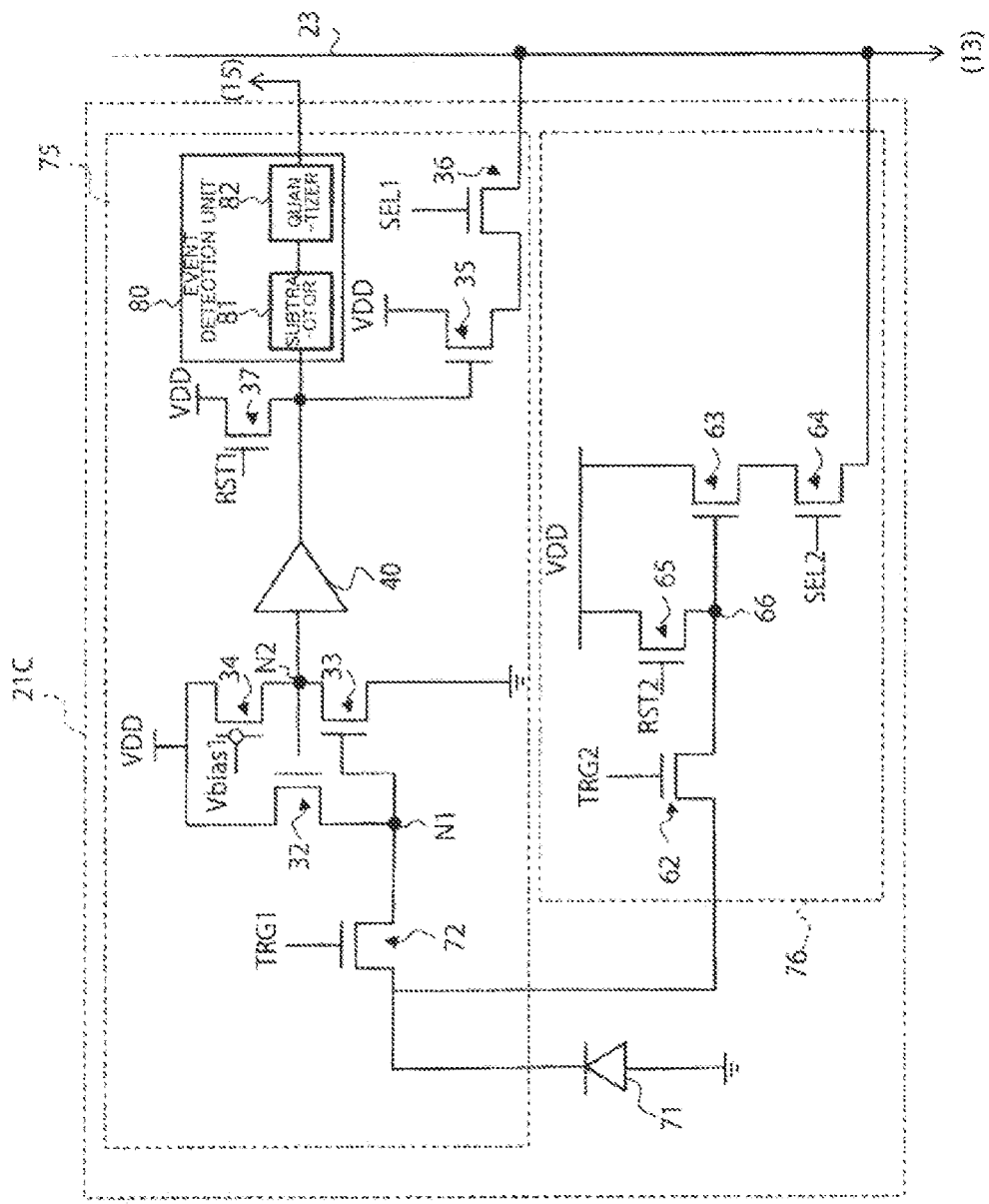
FIG. 19 is a diagram depicting a modification of the circuit configuration of the hybrid pixel.

FIG. 19 indicates an example of a circuit configuration where the event detection unit 80 is added to the logarithmic pixel read unit 75 in FIG. 18. The configurations and operations of the event detection unit 80 are the same as those described with reference to FIG. 9 and FIG. 10. The event detection unit 80 may be added to the logarithmic pixel read unit 75 in FIG. 17.

Modification 3

Figure 20:
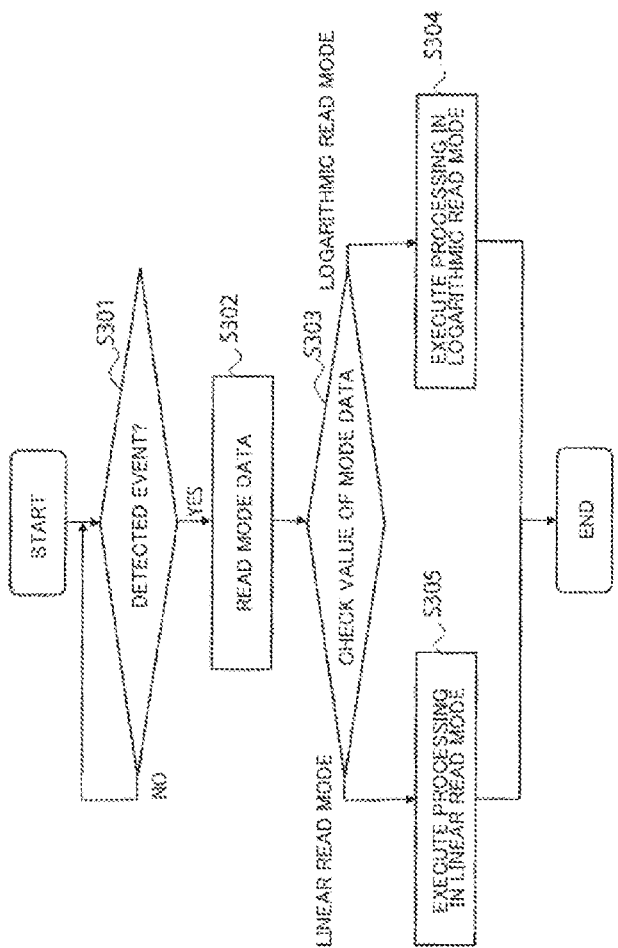
FIG. 20 is a flow chart of a modification of an operation of the solid-state imaging apparatus according to Embodiment 3.

FIG. 20 is a flow chart of an operation example of the solid-state imaging apparatus in FIG. 16. Here it is assumed that the circuit configuration, including the event detection unit 80 in FIG. 19, is used for the configuration of the hybrid pixel 21C.

The control unit 15 controls the event detection unit 80 of each hybrid pixel 21C, and determines whether or not an event is detected (S301). Detection of an event corresponds to detection of the change in contrast (e.g. detection of an object), for example. In the case where a detection signal is received from each hybrid pixel 21C, it is determined that an event is detected in each hybrid pixel 21C, and in the case where a non-detection signal is received, or where a detection signal is not received, it is determined that no event is detected in each hybrid pixel 21C.

In the case where it is determined in all the hybrid pixels 21C that no event is detected (NO), this step is repeated again when a predetermined time elapses. In the case where there is a hybrid pixel 21C for which it was determined that an event is detected (YES), the mode data is read from the mode indicating unit 25 (S302), and the value of the mode data is checked (S303).

In the case where the value of the mode data indicates the logarithmic read mode, the processing in the logarithmic read mode is executed for the hybrid pixel 21C for which was determined that an event is detected (S304). This processing is the same as steps S203 and S204 in FIG. 14. In this case, the CDS processing may be performed using the reset transistor 37, or pixel signals may be read without the CDS processing. When the pixel data is assigned to each input node of the neural network, the pixel data the same as previously (data of the pixel signals read from the logarithmic pixel read unit 75) can be used for the hybrid pixels in which an even is not detected.

In the case where the value of the mode data indicates the linear read mode, the processing in the linear read mode is executed for the hybrid pixel 21C for which it was determined that an event is detected (S305). This processing is the same as step S205 in FIG. 14 and steps S206 to S214 in FIG. 15. For the reading from the linear pixel read unit 76 as well, the CDS processing may be performed in the same manner as the logarithmic pixel read unit 75 (this is the same for Embodiment 2 as well). When the pixel data is assigned to each input node of the neural network, the pixel data the same as previously (data of the pixel signals read from the linear pixel read unit 76) can be used for the hybrid pixels for which it was determined that an event is not detected. It is assumed that in the internal buffer of the data storage unit 18 or the arithmetic processing unit 19, the pixel data is stored for the linear read mode and the logarithmic read mode independently. The processing in this slow chart may be repeated at every predetermined time.

Figure 21:
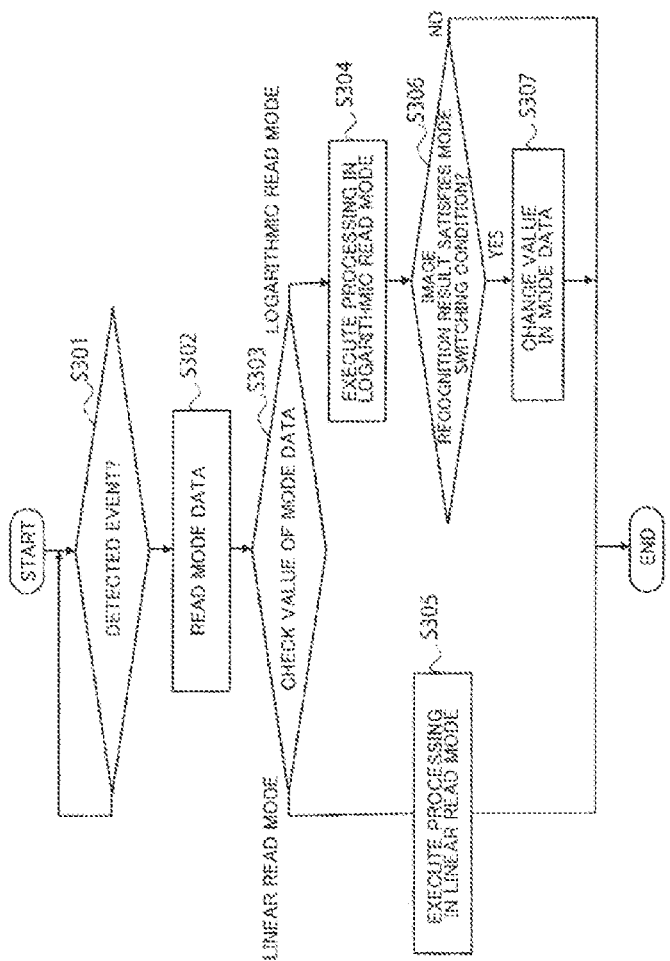
FIG. 21 is a flow chart of another modification of an operation of the solid-state imaging apparatus according to Embodiment 3.

FIG. 21 is a flow chart of another modification of an operation of the solid-state imaging apparatus in FIG. 16. Steps S306 and S307 are added after step S304 in the flow chart in FIG. 20. In step S306, it is determined whether the result of the image recognition in the logarithmic read mode in step S304 satisfies the mode switching condition. The mode switching condition is, for example, to detect a predetermined object, but the condition is not limited to this, and may be any other condition. In the case where the mode switching condition is not satisfied (NO), the processing in this flow chart ends. In the case where the mode switching condition is satisfied, the value of the mode data of the mode indicating unit 25 is changed to indicate the linear read mode. The value of the mode data may be changed by the CPU 17, or by an external apparatus, or by any other apparatus. Thereby the processing in the linear read mode (S305) is executed from the next operation. In other words, the image recognition can be performed in the logarithmic read mode with lower power consumption until the mode switching condition is satisfied, and after the mode switching condition is satisfied, the mode is switched to the linear read mode and high precision image recognition can be performed.

Processing similar to the flow charts in FIG. 20 and FIG. 21 can also be performed by the solid-state imaging apparatus according to Embodiment 2 (see FIG. 11). For example, the logarithmic pixel 21A and the linear pixel 21B are corresponded with each other in advance, and the information of correspondence is stored in the internal buffer of the control unit 15, or in a storage unit that the control unit 15 can access. The control unit 15 determines whether an event is detected or not using the event detection unit 80 in each logarithmic pixel 21A. In the case where an event is detected, the value of the mode data is checked. If the value of the mode data indicates the logarithmic read mode, reading is performed from the logarithmic pixel 21A. If the value of the mode data indicates the linear read mode, reading is performed from the linear pixel 21B corresponded to the logarithmic pixel 21A. The other operations are the same as the description of Modification 3.

(Configuration of Electric Device)

The first to third solid-stage imaging apparatuses can be used for various electronic devices, such as a mobile device having imaging functions (e.g. smartphone, tablet, portable telephone), an imaging device such as a digital still camera and video camera, a surveillance camera and an on-vehicle camera.

Figure 22:
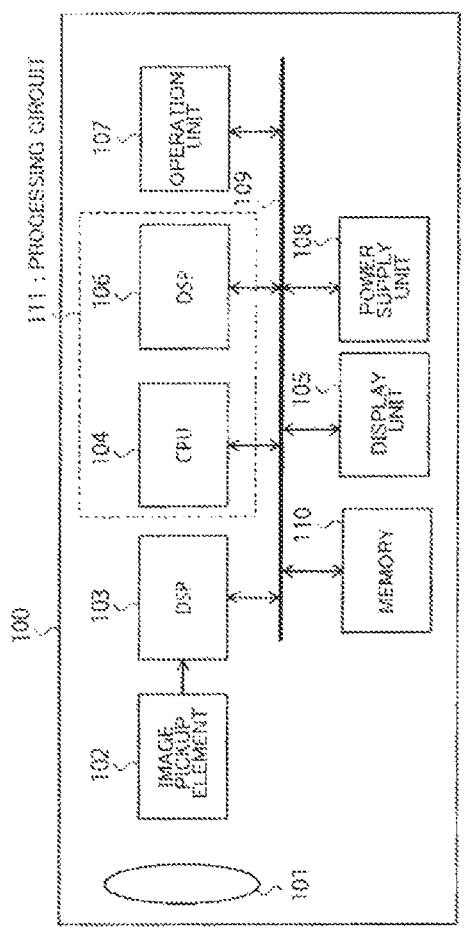
FIG. 22 is a block diagram depicting an example of a configuration of an electronic device according to the present disclosure.

FIG. 22 is a block diagram depicting an example of a configuration of an electronic device according to the present technique. The electronic device 100 in FIG. 22 has an optical system that includes a lens group 101 and the like, an image pickup element 102, a DSP 103, a CPU 104, a display unit 105, a DSP 106, an operation unit 107, a power supply unit 108 and a memory 110. The CPU 104 and the DSP 106 constitute a processing circuit 111. The DSP 103, the CPU 104, the display unit 105, the DSP 106, the operation unit 107, the power supply unit 108, and the memory 110 are interconnected via a bus 109. The image pickup element 102 corresponds to the image pickup element 10 according to Embodiments 1 to 3, the DSP 103 corresponds to the signal processing unit 16, the DSP 106 corresponds to the arithmetic processing unit 19, and the memory 110 corresponds to the data storage unit 18, for example. The processing circuit 111 corresponds to the processing unit 26 according to Embodiments 1 to 3, for example.

The lens group 101 receives incident light from a subject and forms an image on an imaging surface of the image pickup element 102. The image pickup element 102 converts the light quantity of the incident light, which formed an image on the imaging surface by a lens group 101, into electric signals in pixel units, and outputs the electric signals as pixel signals.

The display unit 105 is a panel type display device, such as a liquid crystal display device and an organic electroluminescence (EL) display device. [The display unit 105] displays a moving image or a still image captured by the image pickup element 102. The display unit 105 also displays the result of image recognition by the solid-state imaging apparatus according to Embodiments 1 to 3.

The operation unit 107 transmits operation instructions for various functions of the electronic device 100, based on the operation by the user. The power supply unit 108 supplies various types of operation power to the DSP 103, the memory 110, the display unit 105, the DSP 106 and the operation unit 107. The mode data may be supplied from the operation unit 107, the CPU 104 or the like to the mode indicating unit 25 via the input/output terminal 24 of the image pickup element 102.

The above embodiments are examples to implement the present disclosure, and the present disclosure may be carried out in various other modes. For example, the above embodiments may be modified, replaced, omitted or combined without departing from the spirit and scope of the present disclosure. The modes in which such modification, replacement, omission or the like is performed are included in the scope of the present disclosure, and are included in the scope of the invention disclosed in the claims and equivalents thereof.

The effects of the present disclosure stated in the present description are examples, and other effects may be exhibited as well.

The present disclosure may have the following configuration.

[1]

A solid-state imaging apparatus including: a pixel array unit having a plurality of first pixels that generate electric signals, which have a logarithmic characteristic with respect to light quantity, as first pixel signals; and a processing unit configured to perform arithmetic processing for a first neural network based on a plurality of first input data, which are based on the plurality of first pixel signals read from the pixel array unit, and a plurality of logarithmic weighting factors which express strength of the connection between the plurality of first nodes by a logarithm.

[2]

The solid-state imaging apparatus according to [1], wherein the first pixel signal indicates a voltage value, and the voltage value is in proportion to a logarithm of an electric current value to the base of a predetermined value, and the processing unit generates the first input data by multiplying the value of the first pixel signal by a logarithm of which an anti-logarithm is the predetermined value.

[3]

The solid-state imaging apparatus according to [2], wherein the predetermined value is a Napier's constant.

[4]

The solid-state imaging apparatus according to [2] or [3], wherein the base of the logarithm, of which the anti-logarithm is the predetermined value, is 2.

[5]

The solid-state apparatus according to any one of [1] to [4], further including a control unit, wherein the pixel array unit includes a plurality of second pixels of which type is different from the plurality of first pixels, the control unit selectively executes a first read processing to read the first pixel signals from the plurality of first pixels or a second read processing to read the plurality of second pixel signals from the plurality of second pixels. In a case where the first read processing is executed, the processing unit performs the arithmetic processing of the first neural network, and in a case where the second read processing is executed, the processing unit performs the arithmetic processing of a second neural network based on a plurality of second input data, which are based on the plurality of second pixel signals, and a weighting factor that indicates strength of the connection between the plurality of second nodes.

[6]

The solid-state imaging apparatus according to [5], wherein the control unit selects one of the first read processing and the second read processing, in accordance with indication data that indicates one of the first read processing and the second read processing.

[7]

The solid-state imaging apparatus according to [5], wherein the second pixel is a pixel that generates an electric signal having a linear characteristic with respect to the light quantity, as the second pixel signal.

[8]

The solid-state imaging apparatus according to [5], wherein the second pixel is a pixel that generates a count value of the number of entered photons, as the second pixel signal.

[9]

The solid-state imaging apparatus according to [5], wherein the second pixel is a pixel that generates a charge amount, which indicates a phase difference of a reflected light of an emitted light from the emitted light, as the second pixel signal.

[10]

The solid-state imaging apparatus according to any one of [1] to [9], wherein the first pixel includes: a photoelectric conversion unit; a first read unit that reads an electric signal having a logarithmic characteristic from the photoelectric conversion unit, as the pixel signal; and a second read unit that reads an electric signal having a linear characteristic from the photoelectric conversion unit, as the second pixel signal. The control unit selectively executes a first read processing to read the first pixel signals using the first read unit, or a second read processing to read the second pixel signals using the second read unit. In a case where the first read processing is executed, the processing unit performs the arithmetic processing of the first neural network, and in a case where the second read processing is executed, the processing unit performs the arithmetic processing of a second neural network based on a plurality of second input data, which are based on the plurality of second pixel signals, and a weighting factor which expresses strength of the connection between the plurality of second nodes.

[11]

The solid-state imaging apparatus according to any one of [1] to [10], wherein image recognition is performed for the images indicated by the plurality of first pixel signals using the arithmetic processing of the first neural network.

[12]

An electronic device including: an image pickup element that includes a pixel array unit having a plurality of first pixels that generate electric signals, which have a logarithmic characteristic with respect to light quantity, as first pixel signals; and a processing circuit configured to perform arithmetic processing for a first neural network based on a plurality of first input data, which are based on the plurality of first pixel signals read from the pixel array unit, and a plurality of logarithmic weighting factors which express strength of the connection between the plurality of first nodes by a logarithm.

REFERENCE SIGNS LIST

10 Image pickup element
11 Pixel array unit
12 Vertical drive unit
13 Column processing unit
14 Horizontal drive unit
15 Control unit
16 Signal processing unit
17 CPU
18 Data storage unit
19 Arithmetic processing unit
21 Logarithmic pixel
21A Logarithmic pixel
21B Linear pixel
21C Hybrid pixel
22 Pixel drive line
23 Vertical signal line
24 Input/output terminal
25 Mode indicating unit
26 Processing unit
31, 61, 71 Photodiode
32, 33, 34, 35, 36, 37, 38, 39, 62, 63, 64, 65, 72 MOS transistor
N1, N2 Connection node
N3 Reset node
40 Buffer circuit
66 FD node
41 Input layer
42 Intermediate layer
43 Output layer
51 Selector
52 Adder
53 Subtractor
54 Absolute value arithmetic unit 55 Exponentiation arithmetic unit
56 Flip-flop circuit
80 Event detection unit
81 Subtractor
82 Quantizer
83, 84 Capacitor
85 Inverter
86 Switch
87 Comparator
100 Electronic device
101 Lens group
102 Image pickup element
103, 106 DSP
104 CPU
105 Display unit
107 Operation unit
108 Power supply unit
109 Bus
110 Memory
A1 to Aq Input node (input unit)
B1 to Bj Intermediate node (arithmetic unit)
C1 to Cn Output node (arithmetic unit)
The invention claimed is:

1. A solid-state imaging apparatus, comprising:
a pixel array unit, wherein
the pixel array unit includes:
a plurality of first pixels configured to generate electric signals as a plurality of first pixel signals, and
a plurality of second pixels different from the plurality of first pixels, and
the generated electric signals have a logarithmic characteristic with respect to light quantity;
a control unit configured to selectively execute one of a first read processing to read the plurality of first pixel signals from the plurality of first pixels or a second read processing to read a plurality of second pixel signals from the plurality of second pixels; and
a processing unit configured to:
perform, in a case of execution of the first read processing, arithmetic processing for a first neural network based on a plurality of pieces of first input data, and a plurality of logarithmic weighting factors which express strength of a connection between a plurality of first nodes of the first neural network by a logarithm, wherein the plurality of pieces of first input data is based on the plurality of first pixel signals read from the pixel array unit; and
perform, in a case of execution of the second read processing, the arithmetic processing for a second neural network based on a plurality of pieces of second input data and a plurality of weighting factors that indicates strength of a connection between a plurality of second nodes of the second neural network, wherein the plurality of pieces of second input data is based on the plurality of second pixel signals.

2. The solid-state imaging apparatus according to claim 1, wherein
each of the plurality of first pixel signals indicates a voltage value,
the voltage value is in proportion to a logarithm of an electric current value to the base of a specific value, and
the processing unit is configured to generate a piece of first input data of the plurality of pieces of first input data by multiplying the value of a first pixel signal of the plurality of first pixel signals by a logarithm of which an anti-logarithm is the specific value.

3. The solid-state imaging apparatus according to claim 2, wherein the specific value is a Napier's constant.

4. The solid-state imaging apparatus according to claim 2, wherein the base of the logarithm, of which the anti-logarithm is the specific value, is 2.

5. The solid-state imaging apparatus according to claim 1, wherein the control unit is further configured to select one of the first read processing or the second read processing, based on indication data that indicates one of the first read processing or the second read processing.

6. The solid-state imaging apparatus according to claim 1, wherein each of the plurality of second pixels is a pixel that is configured to generate an electric signal having a linear characteristic with respect to the light quantity, as a second pixel signal of the plurality of second pixel signals.

7. The solid-state imaging apparatus according to claim 1, wherein each of the plurality of second pixels is a pixel that is configured to generate a count value of a number of entered photons, as a second pixel signal of the plurality of second pixel signals.

8. The solid-state imaging apparatus according to claim 1, wherein each of the plurality of second pixels is a pixel that is configured to generate a charge amount, which indicates a phase difference of a reflected light of an emitted light from the emitted light, as a second pixel signal of the plurality of second pixel signals.

9. The solid-state imaging apparatus according to claim 1, wherein
each pixel of the plurality of first pixels-pixel includes:
a photoelectric conversion unit;
a first read unit configured to read an electric signal having a logarithmic characteristic from the photoelectric conversion unit, as a first pixel signal of the plurality of first pixel signals; and
a second read unit configured to read an electric signal having a linear characteristic from the photoelectric conversion unit, as a second pixel signal of the plurality of second pixel signals, and
the control unit is further configured to selectively execute the first read processing to read the plurality of first pixel signals using the first read unit, or a second read processing to read the plurality of second pixel signals using the second read unit.

10. The solid-state imaging apparatus according to claim 1, wherein the processing unit is further configured to perform image recognition for images indicated by the plurality of first pixel signals, based on the arithmetic processing of the first neural network.

11. An electronic device, comprising:
an image pickup element that includes a pixel array unit, wherein
the pixel array unit includes:
a plurality of first pixels configured to generate electric signals as a plurality of first pixel signals, and
a plurality of second pixels different from the plurality of first pixels, and
the generated electric signals have a logarithmic characteristic with respect to light quantity;
a control unit configured to selectively execute one of a first read processing to read the plurality of first pixel signals from the plurality of first pixels or a second read processing to read a plurality of second pixel signals from the plurality of second pixels; and
a processing circuit configured to:
perform, in a case of execution of the first read processing, arithmetic processing for a first neural network based on a plurality of pieces of first input data, and a plurality of logarithmic weighting factors which express strength of a connection between a plurality of first nodes of the first neural network by a logarithm, wherein the plurality of pieces of first input data is based on the plurality of first pixel signals read from the pixel array unit; and perform, in a case of execution of the second read processing, the arithmetic processing for a second neural network based on a plurality of pieces of second input data and a plurality of weighting factors that indicates strength of a connection between a plurality of second nodes of the second neural network, wherein the plurality of pieces of second input data is based on the plurality of second pixel signals.

* * * * *